United States Patent
Imai

(10) Patent No.: US 11,902,672 B2
(45) Date of Patent: Feb. 13, 2024

(54) FLICKER MEASUREMENT DEVICE, FLICKER MEASUREMENT METHOD, FLICKER MEASUREMENT PROGRAM, FLICKER EVALUATION ASSISTANCE DEVICE, FLICKER EVALUATION ASSISTANCE METHOD, AND FLICKER EVALUATION ASSISTANCE PROGRAM

(71) Applicant: Konica Minolta Inc., Tokyo (JP)

(72) Inventor: Katsuki Imai, Kyotanabe (JP)

(73) Assignee: Konica Minolta, Inc., Tokyo (JP)

( * ) Notice: Subject to any disclaimer, the term of this patent is extended or adjusted under 35 U.S.C. 154(b) by 396 days.

(21) Appl. No.: 17/283,033

(22) PCT Filed: Aug. 20, 2019

(86) PCT No.: PCT/JP2019/032512
§ 371 (c)(1),
(2) Date: Apr. 6, 2021

(87) PCT Pub. No.: WO2020/079946
PCT Pub. Date: Apr. 23, 2020

(65) Prior Publication Data
US 2021/0352202 A1    Nov. 11, 2021

(30) Foreign Application Priority Data
Oct. 17, 2018  (JP) ................................. 2018-195624

(51) Int. Cl.
*H04N 23/745*  (2023.01)
*G01J 1/44*  (2006.01)

(52) U.S. Cl.
CPC .............. *H04N 23/745* (2023.01); *G01J 1/44* (2013.01); *G01J 2001/444* (2013.01)

(58) Field of Classification Search
CPC ......... H04N 23/745; H04N 23/70; G01J 1/44; G01J 2001/444; G01J 1/36; G01J 2001/4247; G09G 3/006; G01M 11/00
See application file for complete search history.

(56) References Cited

U.S. PATENT DOCUMENTS

| | | | |
|---|---|---|---|
| 2005/0225649 A1* | 10/2005 | Shinotsuka ............ | H04N 23/70 348/226.1 |
| 2015/0206494 A1* | 7/2015 | Syu ...................... | G09G 3/3696 345/207 |
| 2023/0033014 A1* | 2/2023 | Masuda ................ | G01J 1/0228 |

FOREIGN PATENT DOCUMENTS

| JP | 2002-350284 A | 12/2002 |
|---|---|---|
| JP | 2005-107527 A | 4/2005 |

(Continued)

OTHER PUBLICATIONS

English translation of JP 2005109535 A (Year: 2005).*
(Continued)

*Primary Examiner* — Shahbaz Nazrul
(74) *Attorney, Agent, or Firm* — RANKIN, HILL & CLARK LLP

(57) ABSTRACT

A flicker measurement device includes a first processing unit that performs a first process of calculating respective flicker values of a plurality of measurement regions set on a measurement object based on a photometric quantity of the measurement object obtained from the measurement object under a measurement condition of a flicker for each of the plurality of measurement conditions stored in advance in a measurement condition storage unit, a second processing unit that performs a second process of generating linked data in which data composed of the respective flicker values of the plurality of measurement regions calculated by the first processing unit and the measurement conditions are linked for each of the plurality of measurement conditions, and a (Continued)

third processing unit that performs a third process of storing the linked data generated by the second processing unit in a linked data storage unit for each of the plurality of measurement conditions.

10 Claims, 14 Drawing Sheets

(56) References Cited

FOREIGN PATENT DOCUMENTS

| JP | 2005-109535 A | 4/2005 |
| JP | 2006-3867 A | 1/2006 |
| JP | 2011-163947 A | 8/2011 |
| JP | 2013-37366 A | 2/2013 |
| JP | 2014-164159 A | 9/2014 |

OTHER PUBLICATIONS

English translation of JP 2006003867 A (Year: 2006).*
Chinese Office Action (CNOA) dated Apr. 4, 2023 issued in Chinese Application No. 201980067083.7 and its English translation.
Japanese Office Action (JPOA) dated Sep. 6, 2022 for Japanese Patent Application No. 2020-552551; English translation.
International Search Report (ISR) dated Oct. 21, 2019 filed in PCT/JP2019/032512 and its English translation.
PCT Written Opinion of the International Seaching Authority dated Oct. 21, 2019 filed in PCT/JP2019/032512 and its English translation.

* cited by examiner

MEASUREMENT CONDITION LIST 222a

— MEASUREMENT CONDITION (1): MEASUREMENT CONDITION ID6-1, DISPLAY CONDITION ID7-1, CALCULATION CONDITION ID8-1

— MEASUREMENT CONDITION (2): MEASUREMENT CONDITION ID6-2, DISPLAY CONDITION ID7-2, CALCULATION CONDITION ID8-2

FIG. 9

LINKED DATA LIST 251-1
- ID OF SMARTPHONE SP-1
- MEASUREMENT CONDITION ID6-1, RESPECTIVE FLICKER VALUES OF MEASUREMENT REGIONS 10-1 TO 10-5
  25-1
- MEASUREMENT CONDITION ID6-2, RESPECTIVE FLICKER VALUES OF MEASUREMENT REGIONS 10-1 TO 10-5
  25-2

FLICKER MEASUREMENT DEVICE, FLICKER MEASUREMENT METHOD, FLICKER MEASUREMENT PROGRAM, FLICKER EVALUATION ASSISTANCE DEVICE, FLICKER EVALUATION ASSISTANCE METHOD, AND FLICKER EVALUATION ASSISTANCE PROGRAM

TECHNICAL FIELD

The present invention relates to a technique for measuring a flicker value on a screen of, for example, a liquid crystal display.

BACKGROUND ART

The flicker measurement device includes a spot type flicker measurement device and a two-dimensional flicker measurement device. The spot type flicker measurement device includes a probe, and measures the flicker value in the measurement region with the probe close to the measurement region (spot region) (for example, Patent Literature 1). The two-dimensional flicker measurement device includes a two-dimensional imaging device, and measures a flicker value in a two-dimensional region (for example, Patent Literature 2).

In order to evaluate the unevenness of a flicker generated on the screen of the display, the respective flicker values of the plurality of measurement regions set on the screen of the display are measured. Since the flicker value in the two-dimensional region can be measured according to the two-dimensional flicker measurement device, one two-dimensional flicker measurement device can measure the respective flicker values of a plurality of measurement regions at once.

Since the unevenness of a flicker may be different when the flicker measurement conditions are different, it is desirable to evaluate the unevenness of a flicker under a plurality of measurement conditions. However, in this case, since data to be managed (for example, the flicker value measured under each of a plurality of measurement conditions for the respective contents of a plurality of measurement conditions, and each of the plurality of measurement regions set on the display screen) increases, the data is required to be managed efficiently.

CITATION LIST

Patent Literature

Patent Literature 1: JP 2002-350284 A
Patent Literature 2: JP 2005-109535 A

SUMMARY OF INVENTION

An object of the present invention is to provide a flicker measurement device, a flicker measurement method, and a flicker measurement program capable of efficiently managing data necessary for evaluating unevenness of a flicker.

Another object of the present invention is to provide a flicker evaluation assistance device, a flicker evaluation assistance method, and a flicker evaluation assistance program that can support the evaluation of a flicker based on the data necessary for evaluating the unevenness of a flicker.

In order to realize the above-described object of the present invention, the flicker measurement device according to an aspect of the present invention includes a first processing unit, a second processing unit, and a third processing unit. The first processing unit performs, based on a photometric quantity of a measurement object obtained from the measurement object under a flicker measurement condition, a first process of calculating respective flicker values of a plurality of measurement regions set on the measurement object for each of a plurality of measurement conditions stored in advance in a measurement condition storage unit. The second processing unit performs, for each of the plurality of measurement conditions, a second process of generating linked data in which data composed of the respective flicker values of the plurality of measurement regions calculated by the first processing unit and the measurement conditions are linked. The third processing unit performs, for each of the plurality of measurement conditions, a third process of storing the linked data generated by the second processing unit in a linked data storage unit.

The advantages and features provided by one or a plurality of embodiments of the invention are fully understood from the detailed description and accompanying drawings provided below. These detailed descriptions and accompanying drawings are given by way of example only and are not intended as a limited definition of the present invention.

BRIEF DESCRIPTION OF DRAWINGS

FIG. 9 is an explanatory diagram illustrating an example of a linked data list related to one DUT screen of the nine DUT screens.

DESCRIPTION OF EMBODIMENTS

Figure 1:
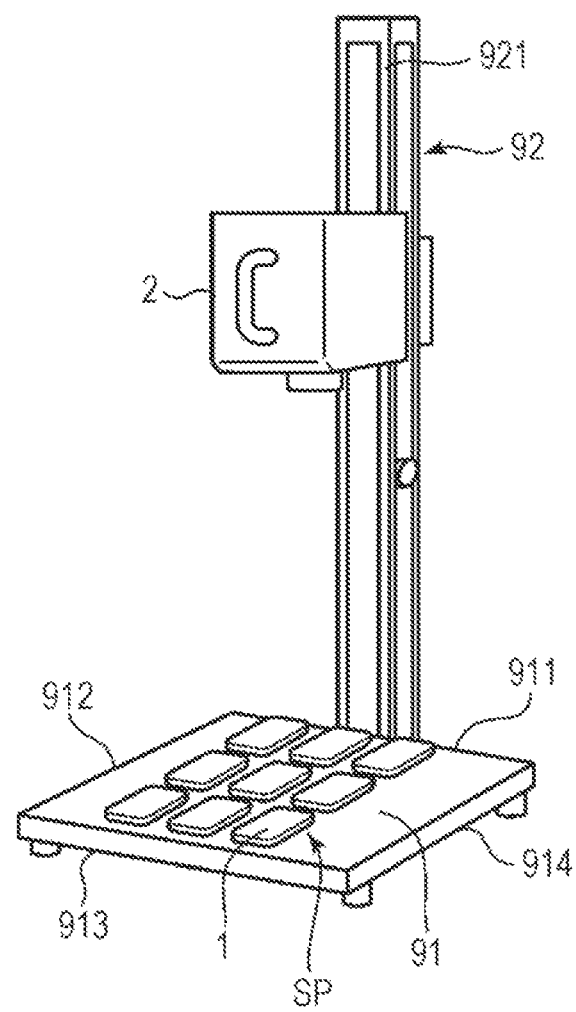
FIG. 1 is an explanatory diagram illustrating an arrangement relationship between a two-dimensional flicker measurement device and a plurality of smartphones.

Hereinafter, one or a plurality of embodiments of the present invention will be described with reference to the drawings. However, the scope of the invention is not limited to the disclosed embodiments.

In each figure, the configurations with the same reference numerals indicate that they are the same configuration, and the description of the configurations already described will be omitted. When components are individually referred in the present specification, they are each denoted by a reference sign with a hyphen (for example, measurement region 10-1), and when collectively referred, they are denoted by a reference sign without a hyphen (for example, measurement region 10).

Figure 2:
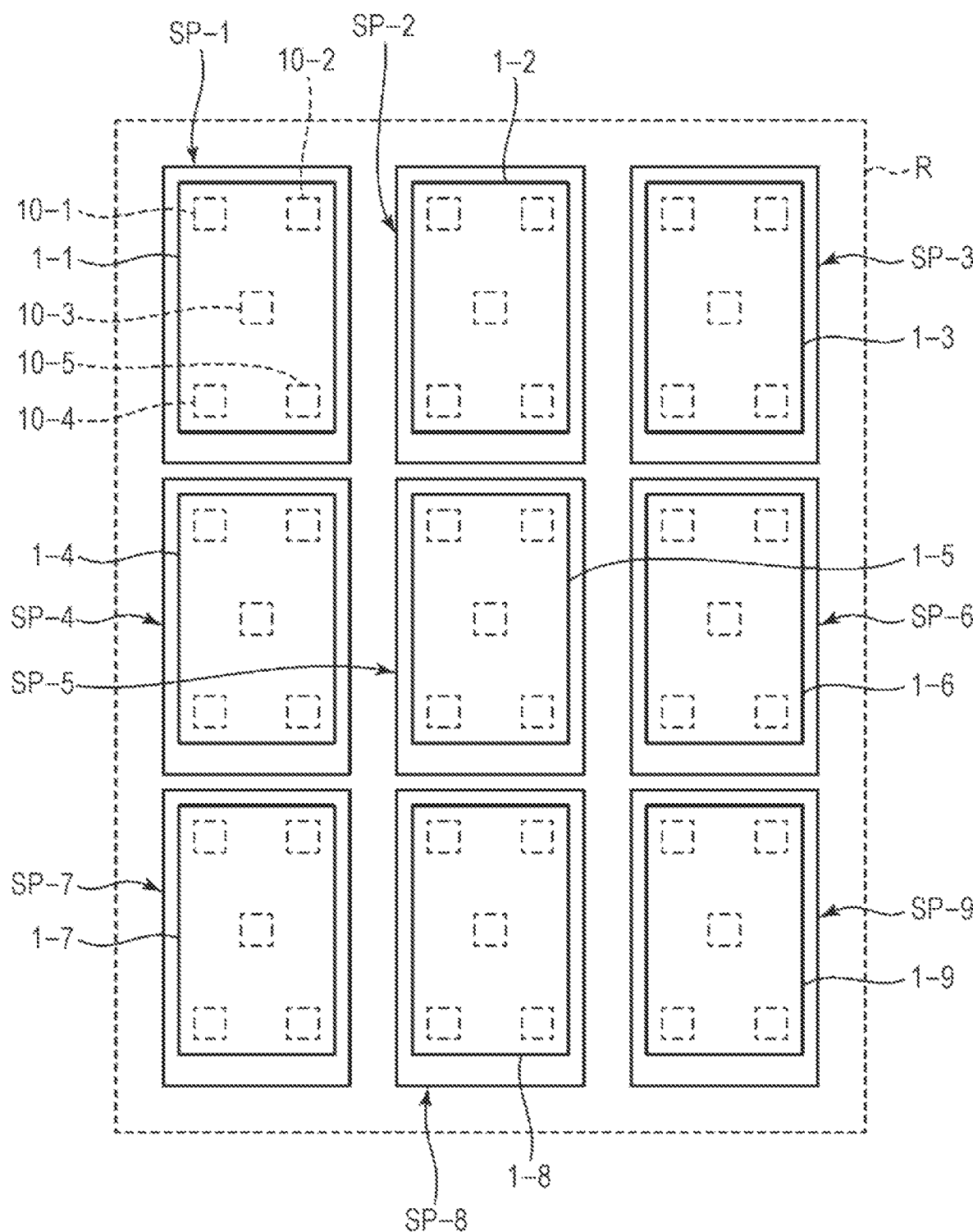
FIG. 2 is a schematic plan view of a plurality of smartphones as seen from a two-dimensional flicker measurement device.

FIG. 1 is an explanatory diagram illustrating an arrangement relationship between a two-dimensional flicker measurement device 2 and a plurality of smartphones SP. FIG. 2 is a schematic plan view of a plurality of smartphones SP as viewed from the two-dimensional flicker measurement device 2. The liquid crystal color display (DUT=Device Under Test) provided in the smartphone SP is a measurement object. The measurement object has a function of displaying an image, and in the embodiment, a screen 1 of the DUT (hereinafter, DUT screen 1) will be described as an example.

The liquid crystal display mounted on a mobile terminal such as a smartphone and a tablet terminal has greater unevenness of a flicker than the liquid crystal displays driven by a household power supply. Since the liquid crystal display mounted on the mobile terminal is battery-powered, it uses a liquid crystal drive method, a liquid crystal structure, and the like to extend the life of the battery. These are the causes of increasing the unevenness of a flicker. The measurement object is not limited to the liquid crystal display mounted on the mobile terminal, but may be a liquid crystal display driven by a household power supply.

Referring to FIGS. 1 and 2, the nine smartphones SP are disposed in a matrix form on a table 91, and the nine smartphones SP are disposed within a shooting range R of an imaging unit 21 (FIG. 3) provided in the two-dimensional flicker measurement device 2. Since the smartphone SP is small, the nine smartphones SP are lined up and each flicker is measured at once. Although the description is made in which the number of smartphones SP is nine as an example, the description is not limited to this, and the number may be a plural other than nine, or may be one.

The shape of the table 91 is rectangular, and the table 91 has a first side portion 911 to a fourth side portion 914. A linear guide 92 extending in the vertical direction is disposed on the first side portion 911. The two-dimensional flicker measurement device 2 is disposed above the plurality of smartphones SP by the linear guide 92. The linear guide 92 includes a guide rail 921 and a block (not shown) that is movable along the guide rail 921 and to which the two-dimensional flicker measurement device 2 is fixed. As a result, the two-dimensional flicker measurement device 2 can move in the linear direction along the guide rail 921.

The two-dimensional flicker measurement device 2 sets a plurality of measurement regions 10 on the DUT screen 1 based on the instruction by a measurer. Five measurement regions 10 are set on the DUT screen 1 in two dimensions. The measurement region 10-3 is set at the center of the DUT screen 1, and the measurement regions 10-1, 10-2, 10-4, and 10-5 are set at the four corners of the DUT screen 1. This setting is an example. The positions of the plurality of measurement regions 10 set on the DUT screen 1 provided in each of the nine smartphones SP are the same. The number of measurement regions 10 set on the DUT screen 1 may be plural, and is not limited to five. A gap is formed between the adjacent measurement regions 10, but the gap may not be formed. The shape of the measurement region 10 is rectangular, but is not limited to this, and may be circular.

Figures 3, 4:
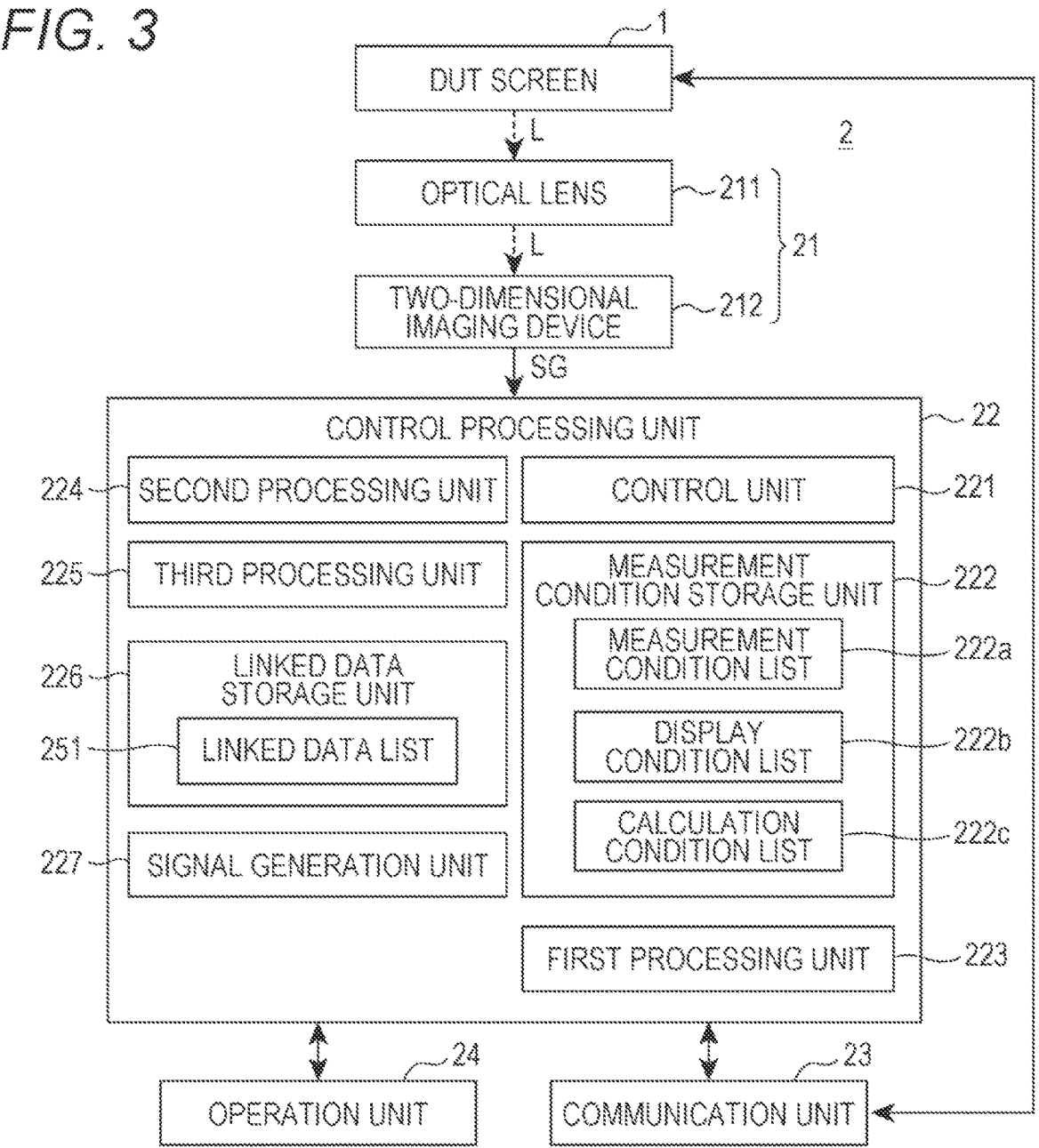
FIG. 3 is a block diagram showing a configuration of a two-dimensional flicker measurement device according to an embodiment.
FIG. 4 is an explanatory diagram illustrating an example of a measurement condition list.

FIG. 3 is a block diagram showing a configuration of the two-dimensional flicker measurement device 2 according to the embodiment. The two-dimensional flicker measurement device 2 includes the imaging unit 21, a control processing unit 22, a communication unit 23, and an operation unit 24. The imaging unit 21 includes an optical lens 211 and a two-dimensional imaging device 212. The optical lens 211 converges light L from the entire DUT screen 1. The light L focused by the optical lens 211 is received by the two-dimensional imaging device 212. The two-dimensional imaging device 212 is an image sensor having a two-dimensional imaging region (for example, a CMOS sensor or a CCD sensor). The two-dimensional imaging device 2112 images the DUT screen 1 on which an image is displayed to output a luminance signal SG of the captured image. The luminance signal SG is a specific example of a signal indicating a photometric quantity.

The luminance is a light intensity of the DUT screen 1 measured by the two-dimensional imaging device 212 having the spectral sensitivity characteristics of the luminosity curve V(λ). The luminance signal SG is a signal indicating this light intensity. Although the luminance signal SG will be described as an example, it may be an image information signal. The image information signal is a light intensity signal (RAW image data) generated by the two-dimensional imaging device 212 when the two-dimensional imaging device 212 having an any spectral sensitivity characteristics images the DUT screen 1. The photometric quantity is a physical quantity that collectively refers to the luminance and the image information signal.

The control processing unit 22 performs various controls and processes necessary for the operation of the two-dimensional flicker measurement device 2. The control processing unit 22 is realized by programs and data for executing the functions of hardware processors such as a central processing unit (CPU), a random access memory (RAM), a read only memory (ROM), and a hard disk drive (HDD), and the control processing unit 22.

The control processing unit 22 includes, as a functional block, a control unit 221, a measurement condition storage unit 222, a first processing unit 223, a second processing unit 224, a third processing unit 225, a linked data storage unit 226, and a signal generation unit 227.

The control unit 221 is a device that controls respective units of the control processing unit 22 (the measurement condition storage unit 222, the first processing unit 223, the second processing unit 224, the third processing unit 225, the linked data storage unit 226, the signal generation unit 227) according to the function of each unit, and that controls the communication unit 23 and the operation unit 24.

The measurement condition storage unit 222 stores a measurement condition list 222a, a display condition list 222b, and a calculation condition list 222c in advance. FIG. 4 is an explanatory diagram illustrating an example of the measurement condition list 222a. The measurement condition list 222a is composed of a plurality of measurement conditions. Since there is a plurality of measurement conditions, an ID (identification) is assigned to each measurement condition. For example, the measurement condition (1) is assigned a measurement condition ID6-1, and the measurement condition (2) is assigned a measurement condition ID6-2.

Each of the plurality of measurement conditions is composed of a measurement condition ID6, a display condition ID7, and a calculation condition ID8. For example, measurement condition (1) is composed of the measurement condition ID6-1, the display condition ID7-1, and the calculation condition ID8-1, and the measurement condition (2) is composed of the measurement condition ID6-2, the display condition ID7-2, and the calculation condition ID8-2.

Figure 5:
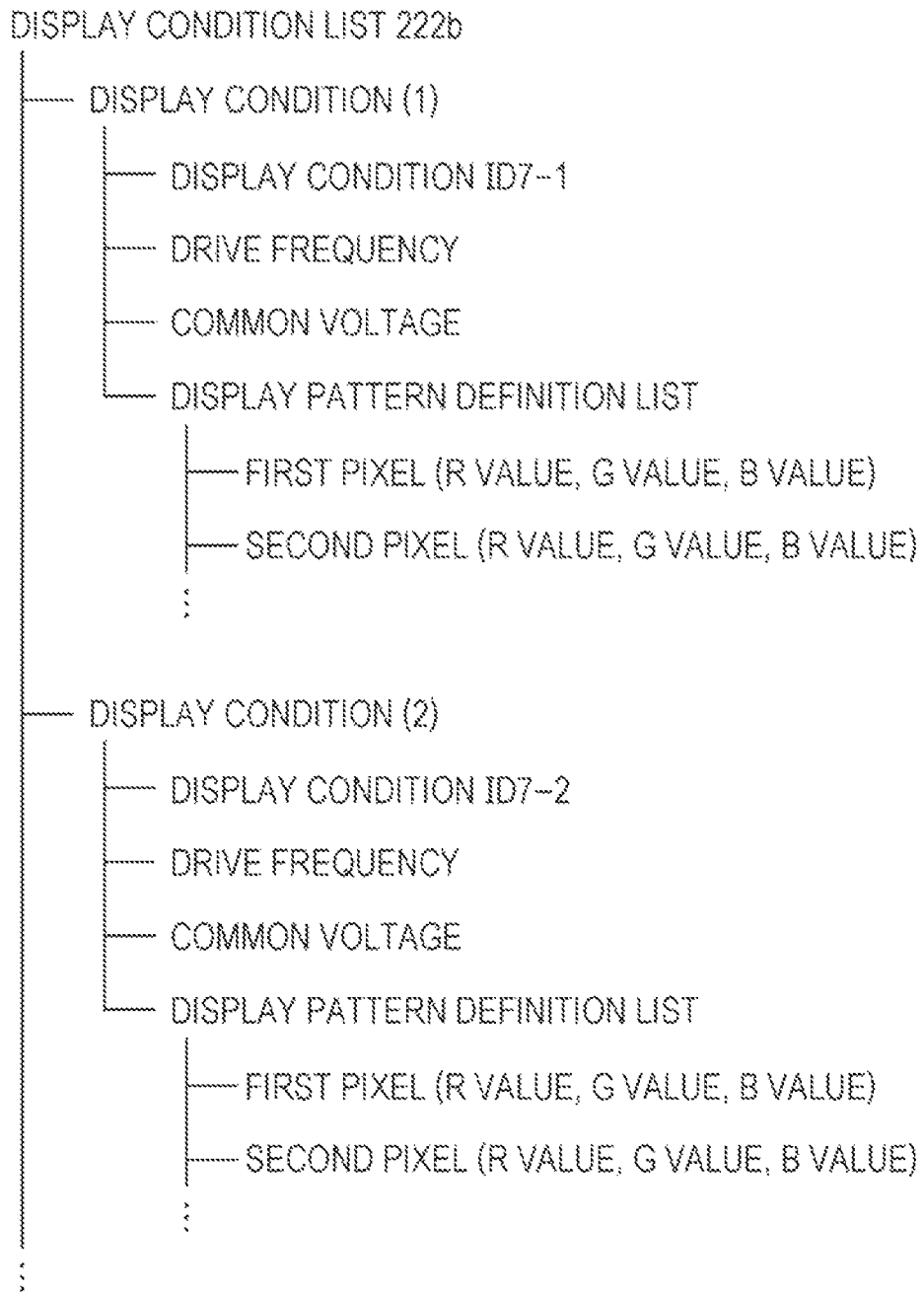
FIG. 5 is an explanatory diagram illustrating an example of a display condition list.

FIG. 5 is an explanatory diagram illustrating an example of the display condition list 222b. The display condition list 222b is composed of a plurality of display conditions. Since there is a plurality of display conditions, an ID is assigned to each display condition. For example, the display condition (1) is assigned a display condition ID7-1, and the display condition (2) is assigned a display condition ID7-2.

The display condition is a condition used to display the display pattern (1st image) for flicker measurement on the DUT screen 1 (measurement object). The DUT screen 1 is a thin film transistor (TFT) liquid crystal panel. Therefore, the DUT screen 1 includes a common electrode. The DUT screen 1 is not limited to a liquid crystal screen such as a TFT liquid crystal panel, and may be, for example, an OLED screen.

The display condition is composed of a display condition ID7, a drive frequency, a common voltage, and a display pattern definition list. The display condition ID7 is an ID assigned to this display condition. The drive frequency is a drive frequency of the DUT screen 1. The common voltage is a voltage applied to the common electrode of the DUT screen 1. The display pattern definition list is a definition of the display pattern displayed on the DUT screen 1. By setting an R value, a G value, and a B value of each pixel of the DUT screen 1 to the values shown in this list, the display pattern defined in this list can be displayed on the DUT screen 1.

Figure 6:
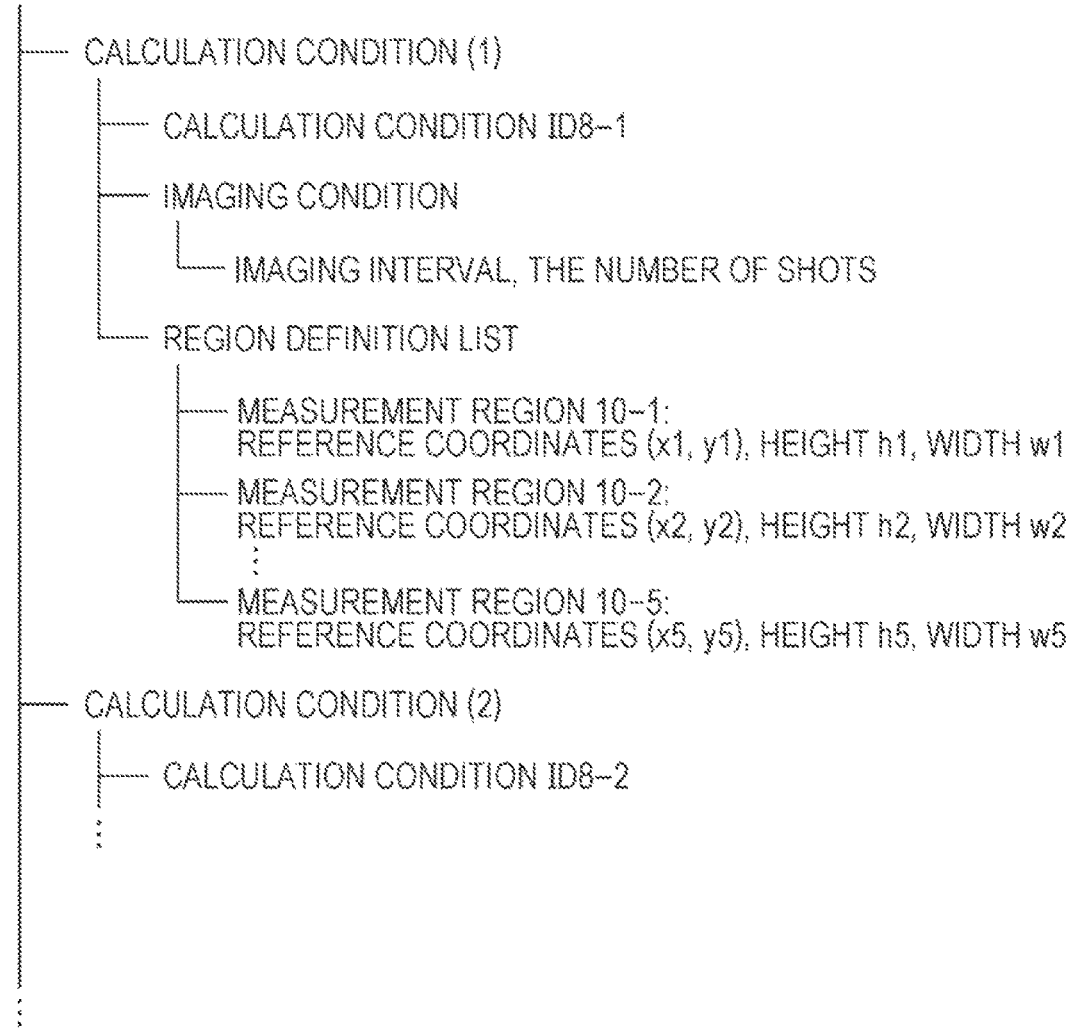
FIG. 6 is an explanatory diagram illustrating an example of a calculation condition list.

FIG. 6 is an explanatory diagram illustrating an example of the calculation condition list 222c. The calculation condition list 222c is composed of a plurality of calculation conditions. Since there is a plurality of calculation conditions, an ID is assigned to each calculation condition. For example, the calculation condition (1) is assigned a calculation condition ID8-1, and the calculation condition (2) is assigned a calculation condition ID8-2.

The calculation condition is a condition used to calculate the flicker value based on the image (2nd image) obtained by imaging the DUT screen 1 on which the imaging unit 21 (FIG. 3) displays the display pattern (1st image). The calculation condition is composed of a calculation condition ID8, an imaging condition, and a region definition list. The calculation condition ID8 is an ID assigned to this calculation condition.

The imaging conditions are the interval and the number of shots at which the imaging unit 21 images the display pattern displayed on the DUT screen 1. The measurer makes these settings in consideration of the measurement accuracy of the flicker value and the measurement time of the flicker value. For example, when the imaging interval is short and the number of shots is large, the measurement accuracy of the flicker value is improved, but the measurement time of the flicker value is long.

The region definition list is a list that defines the respective positions of the five measurement regions 10 at the coordinates with the center of the DUT screen 1 (FIG. 2) as the origin. The region definition list is composed of reference coordinates, a height, and a width. The position of the measurement region 10 is determined by the reference coordinates. The height and width determine the size of the measurement region 10. The heights h1 to h5 of the regions 10-1 to 10-5, respectively, may have the same value or different values. The widths w1 to w5 of the regions 10-1 to 10-5, respectively, may have the same value or different values.

Figure 7:
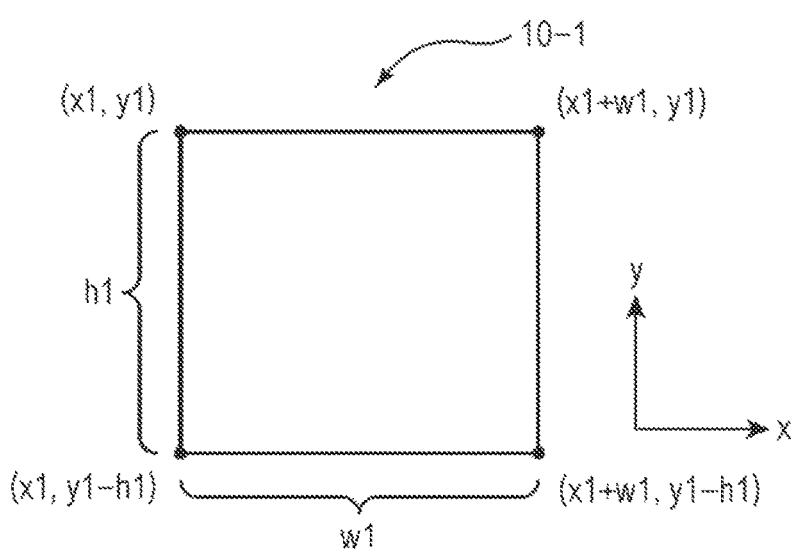
FIG. 7 is an explanatory diagram illustrating an example of a measurement region defined in a region definition list.

The measurement region 10 defined in the region definition list will be described with the measurement region 10-1 as an example. FIG. 7 is an explanatory diagram illustrating an example of the measurement region 10-1 defined in the region definition list. The reference coordinates (x1, y1) define the upper left corner of the measurement region 10-1. The coordinates (x1, y1−h1) define the lower left corner of the measurement region 10-1. The coordinates (x1+w1, y1) define the upper right corner of the measurement region 10-1. The coordinates (x1+w1, y1−h1) define the lower right corner of the measurement region 10-1.

Referring to FIG. 3, the control unit 221 reads out any one measurement conditions among the plurality of measurement conditions included in the measurement condition list 222a (FIG. 4) stored in the measurement condition storage unit 222. The control unit 221 reads the display condition (FIG. 5) to which the display condition ID7 included in the read measurement condition is allocated from the measurement condition storage unit 222. The control unit 221 reads the calculation condition (FIG. 6) to which the calculation condition ID8 included in the read measurement condition is allocated from the measurement condition storage unit 222.

Referring to FIGS. 2 and 3, the first processing unit 223 performs, for each of a plurality of measurement conditions (FIG. 4), the first process of calculating the respective flicker values of the five measurement regions 10 set on the DUT screen 1 based on the photometric quantity of the DUT screen 1 obtained when the imaging unit 21 images the DUT screen 1 under the measurement condition read by the control unit 221. Since the imaging unit 21 images the nine DUT screens 1, the first processing unit 223 performs the first process for each of the nine DUT screens 1. In this way, the first processing unit 223 performs, based on the photometric quantity of the measurement object obtained from the measurement object under the flicker measurement condition, the first process of calculating the respective flicker values of the plurality of measurement regions 10 set on the measurement object for each of a plurality of measurement conditions stored in advance in the measurement condition storage unit 222.

Figure 8:
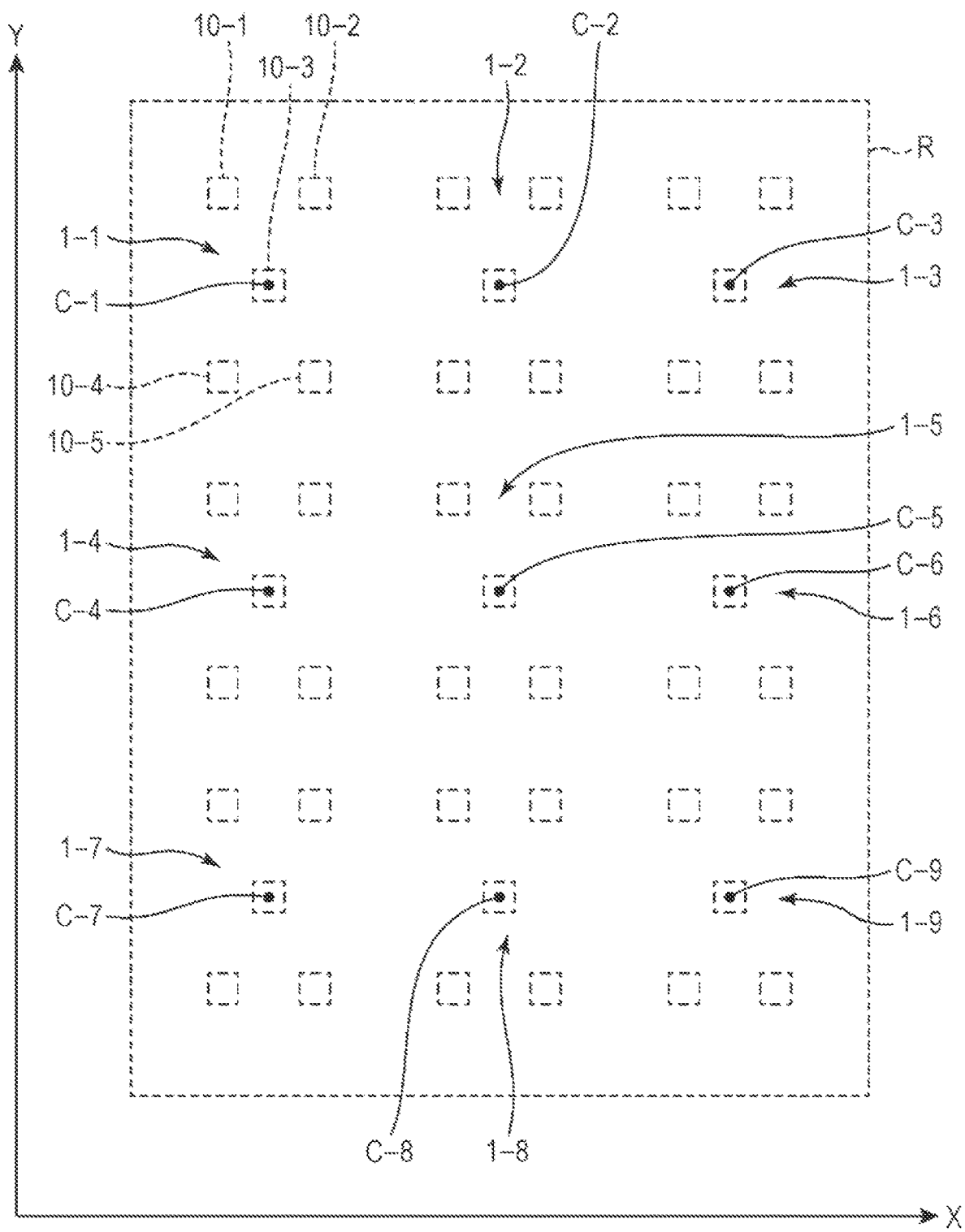
FIG. 8 is an explanatory diagram illustrating a two-dimensional coordinate system showing an example of the relationship between the positions of five measurement regions set on each of the nine DUT screens and the position of the shooting range R.

The first process will be described. The first processing unit 223 stores the coordinate data indicating the shooting range R in advance, and stores, with the nine smartphones SP disposed in the shooting range R, the coordinate data of the center of the DUT screen 1 (in other words, the DUT screens 1-1 to 1-9) mounted on each of the nine smartphones SP in advance. The first processing unit 223 generates, based on the coordinate data and the region definition list (FIG. 6), a two-dimensional coordinate system that shows the relationship between the positions of the measurement regions 10-1 to 10-5 set on each of the DUT screens 1-1 to 1-9, and the position of the shooting range R. FIG. 8 is an explanatory diagram illustrating an example of this two-dimensional coordinate system.

Referring to FIG. 2, FIG. 3, and FIG. 8, the first processing unit 223 determines the respective positions of the five measurement regions 10 (measurement regions 10-1 to 10-5) set on the DUT screen 1-1 with the coordinates of the center C-1 of the DUT screen 1-1 mounted on the smartphone SP-1 as an origin, and determines the respective positions of the five measurement regions 10 set on the DUT screen 1-2 with the coordinates of the center C-2 of the DUT screen 1-2 mounted on the smartphone SP-2 as an origin. The first processing unit 223 makes the same determination for the DUT screens 1-3 to 1-9 mounted on the smartphones SP-3 to SP-9, respectively. As a result, the positions of the five measurement regions 10 set on each of the nine DUT screens 1 are determined on the image (2nd image) captured by the imaging unit 21.

Referring to FIGS. 2 and 3, the first processing unit 223 calculates the respective flicker values of the measurement regions 10-1 to 10-5 set on each of the DUT screens 1-1 to 1-9 based on the photometric quantities of the DUT screens 1-1 to 1-9 obtained when the imaging unit 21 images the DUT screens 1-1 to 1-9. Examples of a calculation method of a flicker value include a contrast method and Japan Electronics and Information Technology Industries Association (JEITA) method. The first processing unit 223 can calculate the flicker value by either the contrast method or the JEITA method. A method other than these methods can be applied to the embodiments.

The second processing unit 224 performs, for each of a plurality of measurement conditions (FIG. 4), the second process of generating linked data 25 in which the data composed of the respective flicker values of the five measurement regions 10 calculated by the first processing unit 223 and the measurement conditions read by the control unit 221 are linked. Since the imaging unit 21 images the nine DUT screens 1, the second processing unit 224 performs the second process for each of the nine DUT screens 1.

The second processing unit 224 generates a linked data list 251 for each of the nine DUT screens 1. The linked data list 251 will be described for the DUT screen 1-1 as an example. FIG. 9 is an explanatory diagram illustrating an example of a linked data list 251-1 related to the DUT screen 1-1. The linked data list 251-1 is composed of the ID of the smartphone SP-1 having the DUT screen 1-1 and a plurality of pieces of linked data 25. The plurality of pieces of linked data 25 corresponds to a plurality of measurement conditions. For example, the linked data 25-1 is the respective flicker values, of the measurement regions 10-1 to 10-5 set on the DUT screen 1-1, which are measured under the measurement condition ID6-1.

The third processing unit 225 stores the respective linked data lists 251 of the nine DUT screens 1 in the linked data storage unit 226. The linked data lists 251 are composed of a plurality of pieces of linked data 25. In this way, the third processing unit 225 performs, for each of a plurality of measurement conditions (FIG. 4), the third process of storing the linked data 25, related to the DUT screen 1, which is generated by the second processing unit 224 in the linked data storage unit 226.

The signal generation unit 227 generates a display pattern signal. The control unit 221 reads the display condition (FIG. 5) to which the display condition ID7 included in the read measurement condition (FIG. 4) is allocated from the measurement condition storage unit 222 to cause the signal generation unit 227 to generate a display pattern signal according to the display pattern definition list included in the display condition.

The communication unit 23 is a communication interface through which the two-dimensional flicker measurement device 2 communicates with an external device. The communication unit 23 is connected to each of the nine DUT screens 1 by a communication cable. The communication cable is, for example, a universal serial bus (USB) cable. The control unit 221 causes the communication unit 23 to transmit the display pattern signal generated by the signal generation unit 227 to each of the nine smartphones SP. As a result, the display pattern (1st image) is displayed on each of the DUT screens 1-1 to 1-9 shown in FIG. 2.

The operation unit 24 is realized by a touch panel, hard keys, or the like. The operation unit 24 is used for focusing the optical lens 211, inputting a flicker value measurement command, and the like.

In addition, part or all of the functions of the control processing unit 22 may be realized by processing by a field programmable gate array (FPGA) in place of or together with the processing by the CPU. Similarly, part or all of the functions of the control processing unit 22 may be realized by processing by a dedicated hardware circuit in place of or together with processing by software.

The control processing unit 22 is composed of a plurality of elements shown in FIG. 3. Therefore, the HDD, which is one of the hardware that realizes the control processing unit 22, stores programs for realizing these elements. That is, this HDD stores programs for realizing each of the control unit 221, the first processing unit 223, the second processing unit 224, the third processing unit 225, and the signal generation unit 227. These programs are expressed as a control program a first processing program, a second processing program, a third processing program, and a signal generation program.

The first processing program, the second processing program, and the third processing program are expressed using the definition of the element. The first processing unit 223 and the first processing program wilt be described as an example. The first processing unit 223 performs, based on the photometric quantity of the measurement object obtained from the measurement object under the flicker measurement condition, the first process of calculating the respective flicker values of the plurality of measurement regions 10 set on the measurement object for each of a plurality of measurement conditions stored in advance in the measurement condition storage unit 222. The first processing program is a program for executing, based on the photometric quantity of the measurement object obtained from the measurement object under the flicker measurement condition, the first process of calculating the respective flicker values of the plurality of measurement regions 10 set on the measurement object for each of a plurality of measurement conditions stored in advance in the measurement condition storage unit 222.

Figure 10:
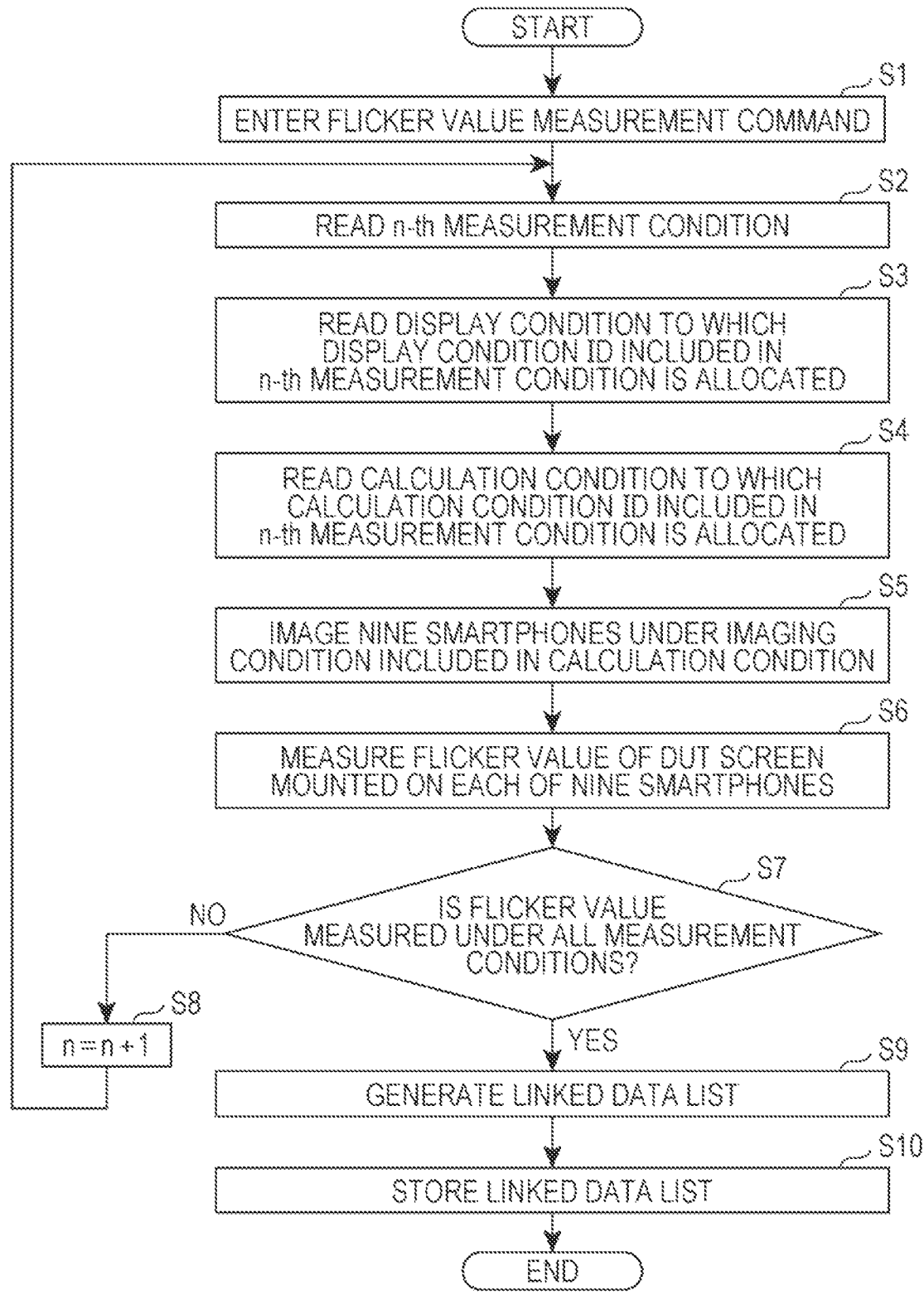
FIG. 10 is a flowchart illustrating an operation in which a two-dimensional flicker measurement device according to an embodiment measures a flicker value.
Figure 11:
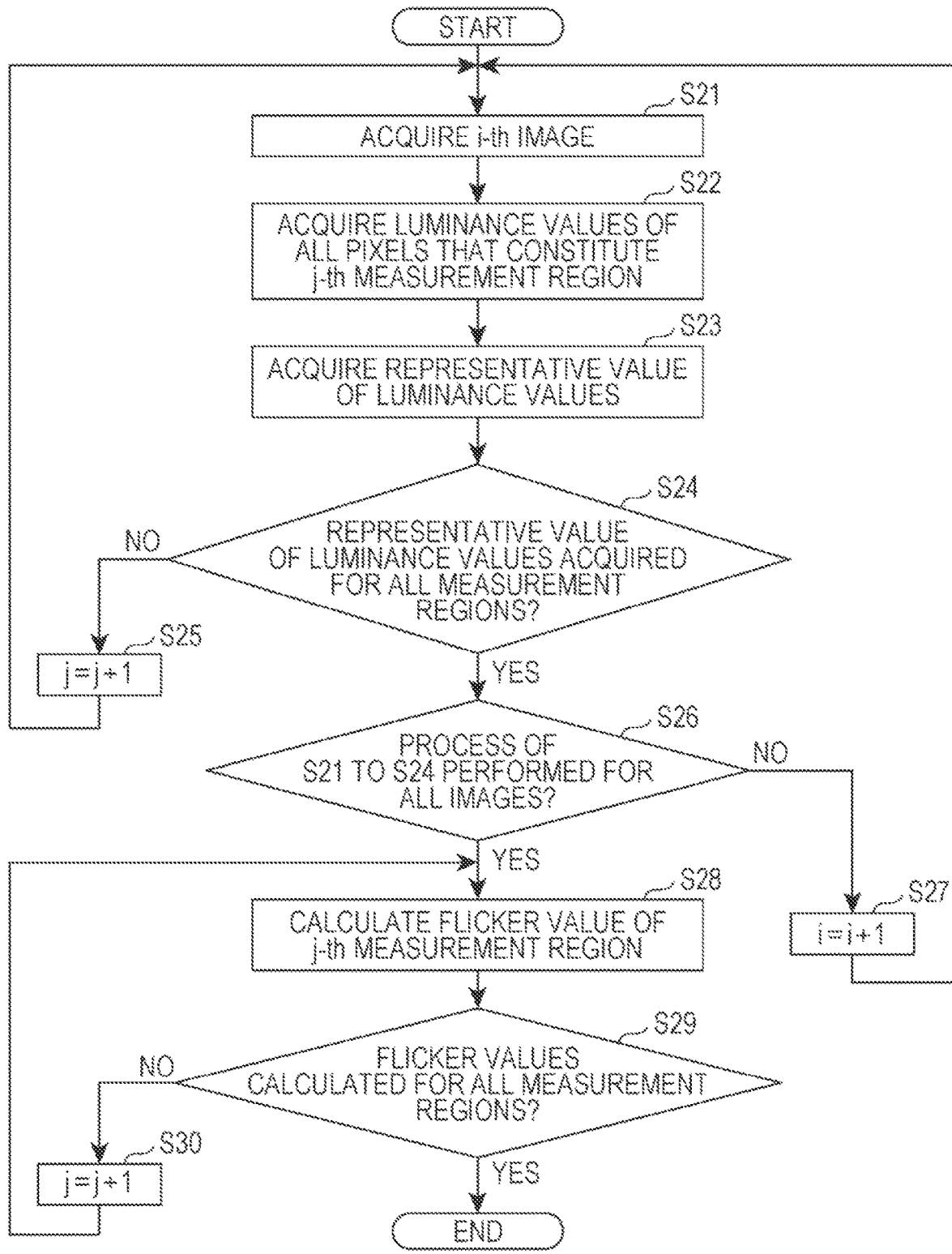
FIG. 11 is a flowchart illustrating the measurement of the flicker value on the DUT screen executed under the measurement condition (1).

The flowchart of these programs (control program, first processing program, second processing program, third processing program, signal generation program) executed by the CPU, which is one of the hardware that realizes the control processing unit 22 is shown in FIGS. 10 and 11.

The operation in which the two-dimensional flicker measurement device 2 according to the embodiment measures the flicker value will be described. FIG. 10 is a flowchart illustrating this operation. Referring to FIGS. 2, 3, and 10, the measurer operates the operation unit 24 with the nine smartphones SP set on table 91 (FIG. 1), and inputs the flicker value measurement command to the control processing unit 22 (step S1).

The control unit 221 sets n=1 and reads out the n-th measurement condition from the measurement condition storage unit 222 among the plurality of measurement conditions shown in FIG. 4 (step S2). Here, the first measurement condition (measurement condition (1)) is read out.

The control unit 221 reads the display condition (1) shown in FIG. 5 to which the display condition ID7-1 included in the measurement condition (1) is allocated from the measurement condition storage unit 222 (step S3).

The control unit 221 causes the signal generation unit 227 to generate a display pattern signal according to the display pattern definition list included in the display condition (1). The control unit 221 commands that the communication unit 23 transmit a signal indicating a drive frequency, a signal indicating a common voltage, and a display pattern signal included in the display condition (1). The communication unit 23 transmits these signals to each of the nine smartphones SP. As a result, the nine smartphones SP drives the respective DUT screens 1-1 to 1-9 under the display condition (1).

The control unit 221 reads the calculation condition (1) shown in FIG. 6 to which the calculation condition ID8-1 included in the measurement condition (1) is allocated from the measurement condition storage unit 222 (step S4).

The control unit 221 commands that the imaging unit 21 image the nine smartphones SP under the imaging conditions included in the calculation condition (1). The imaging unit 21 images the nine smartphones SP under the imaging condition of the calculation condition (1) (step S5). As described above, the nine smartphones SP drives the respective DUT screens 1-1 to 1-9 under the display condition (1).

The control unit 221 commands that the first processing unit 223 measure, based on the images of the nine smartphones SP imaged under the imaging condition of the calculation condition (1) and the region definition list included in calculation condition (1), the flicker values of DUT screen 1 (DUT screen 1-1 to 1-9) mounted on each of the nine smartphones SP. The first processing unit 223 measures the flicker values of the DUT screens 1-1 to 1-9 according to this command (step S6). The details of this measurement will be described later.

The control unit 221 determines whether the flicker values have been measured under all the measurement conditions shown in FIG. 4 (in other words, under each of the plurality of measurement conditions) (step S7). When the control unit 221 determines that the flicker value has not been measured under all the measurement conditions (No in step S7), n=n+1 is set (step S8). As a result, the process of steps S2 to S6 is performed for the next measurement condition (here, measurement condition (2)).

When it is determined that the flicker values have been measured under all measurement conditions (Yes in step S7), the control unit 221 commands that the linked data list 251 of each DUT screen 1 be generated for the respective DUT screens 1-1 to 1-9 mounted on the nine smartphones SP. According to this command, the second processing unit 224 generates the respective linked data lists 251 (linked data lists 251-1 to 251-9) for the DUT screens 1-1 to 1-9 (step S9). As described above, FIG. 9 shows an example of the linked data list 251-1 on the DUT screen 1-1.

The control unit 221 commands that the linked data lists 251-1 to 251-9 be stored in the linked data storage unit 226. The third processing unit 225 stores the linked data lists 251-1 to 251-9 in the linked data storage unit 226 according to this command (step S10).

The measurement of the flicker value (step S6) will be described in detail. This measurement when the measurement of the flicker value of the DUI screen 1-1 is performed under the measurement condition (1) as an example will be described. FIG. 11 is a flowchart illustrating this measurement. The first processing unit 223 sets i=1 and j=1. i indicates the order of the images (2nd image) captured by the imaging unit 21. j indicates the order of measurement regions 10-1 to 10-5. The first processing unit 223 acquires the i-th image among a plurality of images (2nd images) disposed in chronological order captured under the imaging conditions included in the calculation condition (1) shown in FIG. 6 (step S21). Here, the first image (2nd image) is acquired. The first image is the initial image. Since the imaging unit 21 captures a video of the nine smartphones SR the i-th image means the i-th frame.

The first processing unit 223 acquires the luminance values of all the pixels constituting the j-th measurement region 10 included in the image acquired in step S21 (step S22). Here, the first measurement region 10 (measurement region 10-1) is the target.

The first processing unit 223 acquires a representative value of the luminance values acquired in step S22 (step S23). The representative value of the luminance value is a value indicating a statistical tendency with respect to the luminance value of the measurement region 10. The representative value of the luminance value is, for example, the average value of the luminance values of all the pixels constituting the measurement region 10. When the sensitivity varies and the thermal noise is large depending on the position on the two-dimensional imaging device 212, for example, the median value may be used as the representative value of the luminance value.

The first processing unit 223 determines whether the representative values of the luminance value have been acquired for all of the measurement regions 10-1 to 10-5 (step S24). When it is determined that the representative values of the luminance value have not been acquired for all of the measurement regions 10-1 to 10-5 (No in step S24), the first processing unit 223 sets j=j+1 (step S25). As a result, the process of steps S21 to S24 is performed for the next measurement region 10 (here, the measurement region 10-2).

When it is determined that the representative values of the luminance value have been acquired for all of the measurement regions 10-1 to 10-5 (Yes in step S24), the first processing unit 223 determines whether the process of steps S21 to S24 has been performed for all of the plurality of images (2nd image) disposed in the above-mentioned chronological order (step S26).

When it is determined that the process of steps S21 to S24 has not been performed for all of the plurality of images disposed in chronological order (No in step S26), the first processing unit 223 sets i=i+1 (step S27). As a result, the process of steps S21 to S26 is performed on the next image.

Figure 12:
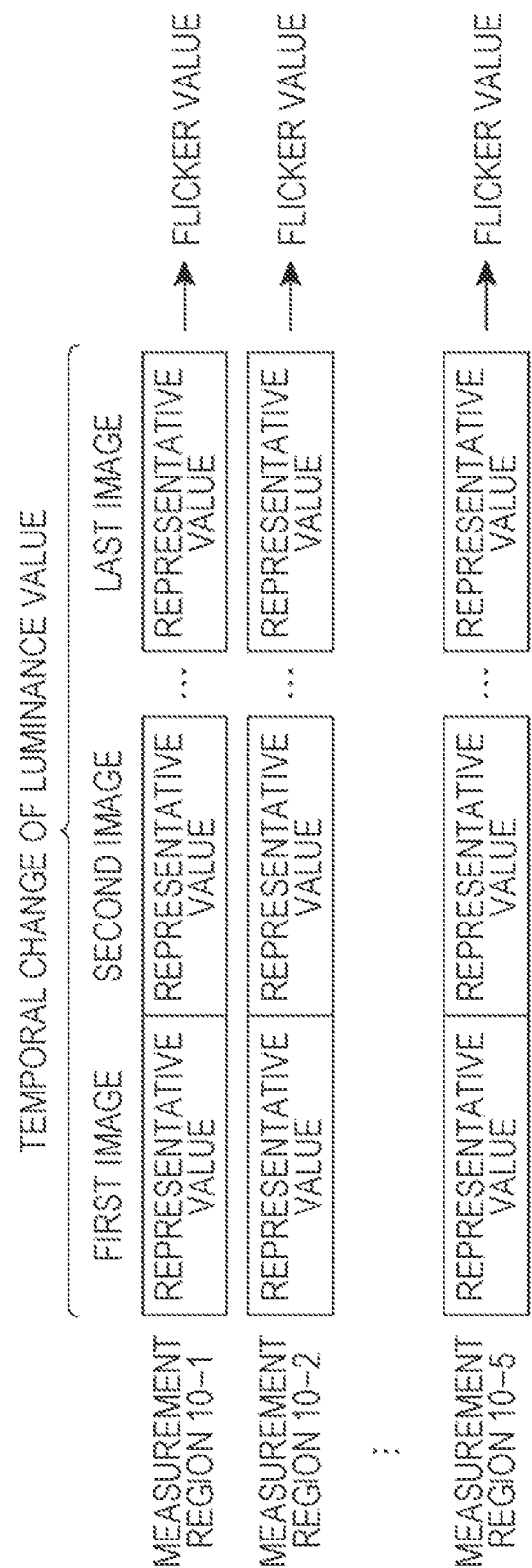
FIG. 12 is an explanatory diagram illustrating calculation of a flicker value for each of the five measurement regions.

When it is determined that the process of steps S21 to S24 has been performed for all of the plurality of images disposed in chronological order (Yes in step S26), the first processing unit 223 sets j=1, and calculates the flicker values of the j-th measurement region 10 (step S28). FIG. 12 is an explanatory diagram illustrating the calculation of the flicker value for each of the measurement regions 10-1 to 10-5. The calculation of the flicker value in the first measurement region 10 (measurement region 10-1) as an example will be briefly described. The first processing unit 223 calculates the flicker value in the measurement region 10-1 using a representative value of the luminance values of the measurement region 10-1 obtained from each of the first to last images (2nd image) (that is, a representative value of the luminance values of the measurement region 10-1 obtained from the first image, a representative value of the luminance values of the measurement region 10-1 obtained from the second image, . . . , and a representative value of the luminance values of the measurement region 10-1 obtained from the last image). The number of first to last images is the number of shots.

The first processing unit 223 determines whether the flicker values have been calculated for all of the measurement regions 10-1 to 10-5 (step S29). When it is determined that the flicker values have not been calculated for all of the measurement regions 10-1 to 10-5, (No in step S29), the first processing unit 223 sets j=j+1 (step S30). As a result, the process of steps S28 to S29 is performed for the next measurement region 10 (here, the measurement region 10-2).

When it is determined that the flicker values have been calculated for all of the measurement regions 10-1 to 10-5 (Yes in step S29), the first processing unit 223 ends the measurement of the flicker value of the DUT screen 1-1 performed under the measurement condition (1).

The main effects of the embodiments will be described. The linked data 25 (FIG. 9) is the data in which the respective flicker values, of the measurement regions 10-1 to 10-5 set on the DUT screen 1, measured under the flicker measurement condition and the measurement conditions are linked. The two-dimensional flicker measurement device 2 according to the embodiment generates the linked data 25 for each of a plurality of measurement conditions, and stores the linked data 25 in the linked data storage unit 226. Therefore, according to the two-dimensional flicker measurement device 2 according to the embodiment, even when the data required for evaluating the unevenness of flickers increases, it can be efficiently managed.

Figure 13:
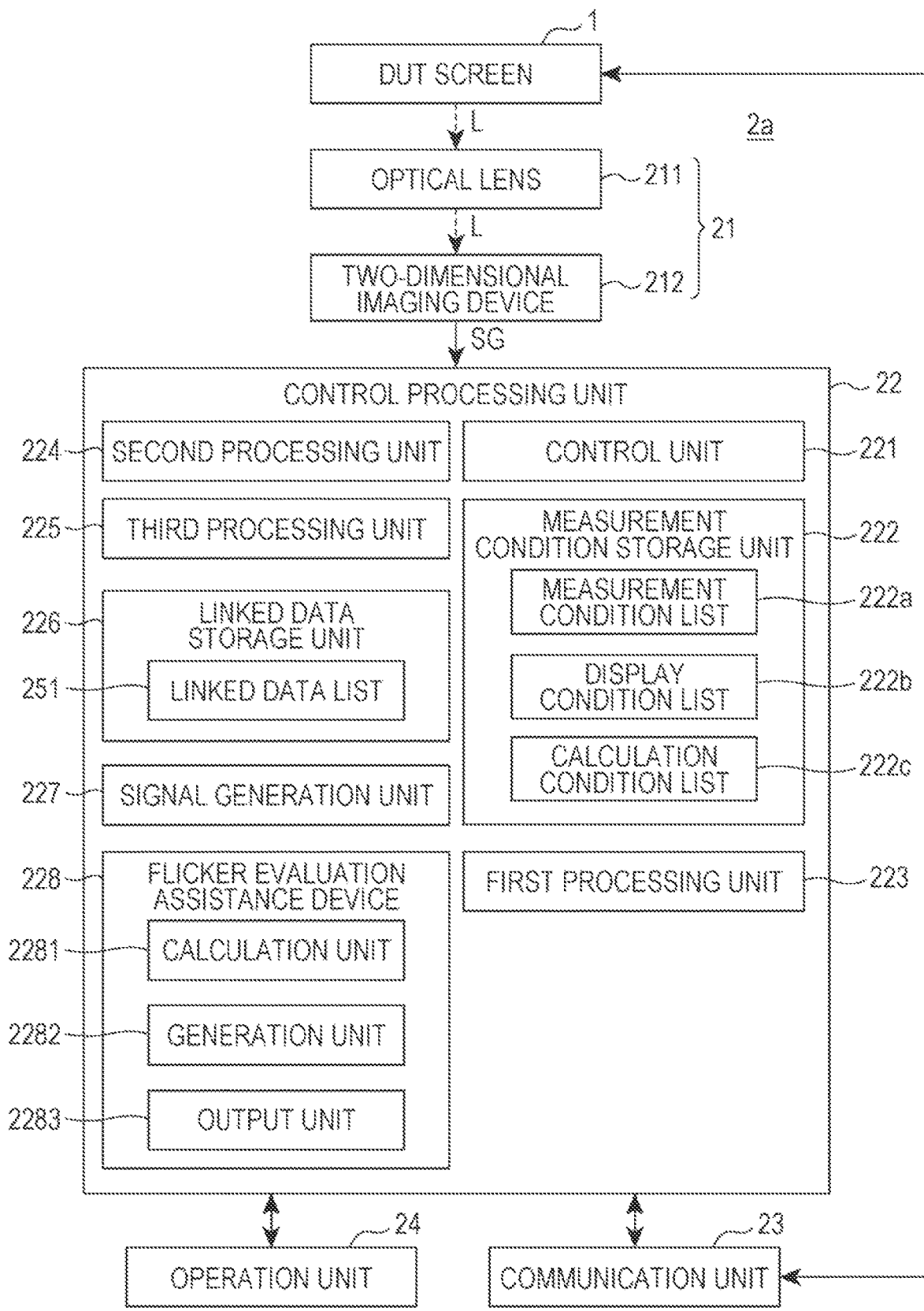
FIG. 13 is a block diagram showing a configuration of a two-dimensional flicker measurement device according to a modification.

A modification of the embodiment will be described. FIG. 13 is a block diagram showing the configuration of a two-dimensional flicker measurement device 2a according to the modification. The two-dimensional flicker measurement device 2a is based on the two-dimensional flicker measurement device 2 according to the embodiment shown in FIG. 3, and the control processing unit 22 includes a flicker evaluation assistance device 228. In the embodiment, the processing shown in FIG. 10 is performed on a large number of DUT screens 1 of the same model (in other words, the same model), and the linked data lists 251 related to these DUT screens 1 are stored in the linked data storage unit 226. When the number of the DUT screens 1 of the same model is, for example, 1000, the linked data storage unit 226 stores 1000 linked data lists 251. In the modification, the statistics of the flicker values are obtained by using the linked data lists 251 related to these DUT screens 1.

The flicker evaluation assistance device 228 is provided in the two-dimensional flicker measurement device 2a, but may be a device independent of the two-dimensional flicker measurement device 2a. In this case, the flicker evaluation assistance device 228 reads out the linked data 25 included in the linked data lists 251 stored in the linked data storage unit 226 provided in the two-dimensional flicker measurement device 2a to find the statistics of the flicker values.

The flicker evaluation assistance device 228 includes a calculation unit 2281, a generation unit 2282, and an output unit 2283. The calculation unit 2281 calculates statistics (statistical values) of the flicker values. The generation unit 2282 generates a graph showing the statistics of the flicker values. The graph may be, for example, a box plot or an Xbar-R control chart. The generation unit 2282 may change the type of graph according to the purpose of collecting statistics. The output unit 2283 outputs a graph. The output unit 2283 may be a display control unit that displays the graph on the display unit, or may be a printing unit that prints the graph. When the output unit 2283 is the display control unit, the display control unit may display a graph on a display (display unit) provided in the operation unit 24, or may display a graph on the display (display unit) of the computer device capable of communicating with the two-dimensional flicker measurement device 2a. When the output unit 2283 is the printing unit, the printer (printing unit) capable of communicating with the two-dimensional flicker measurement device 2a prints the graph.

The modification includes a first modification and a second modification. The first modification will be described first. Referring to FIG. 13, the calculation unit 2281 calculates, for each of the plurality of measurement conditions, the statistics of the flicker values based on the linked data 25 (FIG. 9) included in the linked data list 251 for each of the plurality of measurement conditions (FIG. 4) obtained from each of a large number of DUT screens 1 (plurality of DUT screens 1) of the same model. The generation unit 2282 generates, for each of the plurality of measurement conditions, a graph showing the statistics of the flicker values calculated by the calculation unit 2281. The output unit 2283 outputs the graph generated by the generation unit 2282.

Figure 14:
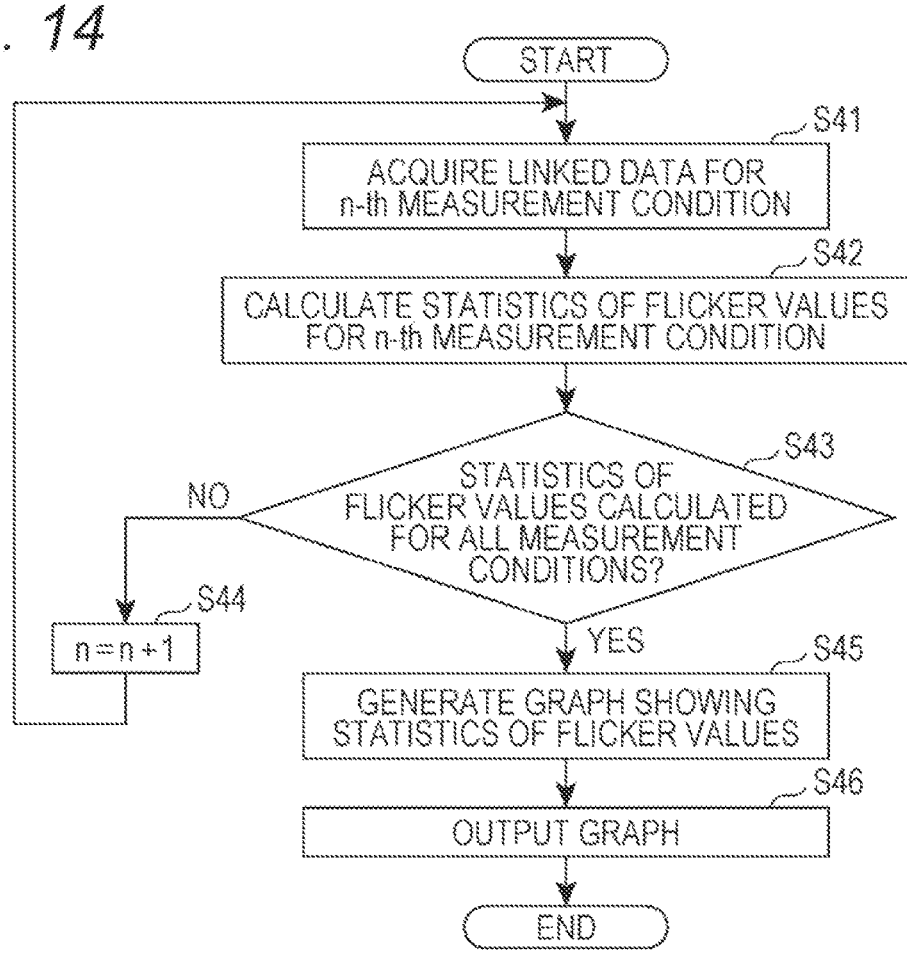
FIG. 14 is a flowchart illustrating the operation of a flicker evaluation assistance device provided in a two-dimensional flicker measurement device according to a first modification.

The HDD, which is one of the hardware that realizes the control processing unit 22, stores a program for realizing each of the calculation unit 2281, the generation unit 2282, and the output unit 2283. These programs are expressed as a calculation program, a generation program, and an output program. These programs are expressed using the definitions of the calculation unit 2281, the generation unit 2282, and the output unit 2283. The calculation unit 2281 and the calculation program will be described as an example. The calculation unit 2281 is as described above. The calculation program is a program that calculates, for each of the plurality of measurement conditions, the statistics of the flicker values based on the linked data 25 included in the linked data list 251 for each of the plurality of measurement conditions obtained from each of the plurality of DUT screens 1. A flowchart of these programs (calculation program, generation program, output program) executed by the CPU, which is one of the hardware that realizes the control processing unit 22, is shown in FIG. 14 to be described later. The above description can also be applied to the second modification described later.

The operation of the flicker evaluation assistance device 228 provided in the two-dimensional flicker measurement device 2a according to the first modification will be described. FIG. 14 is a flowchart illustrating this operation. Referring to FIGS. 13 and 14, the calculation unit 2281 sets n=1, and acquires the linked data 25 for the n-th measurement condition (FIGS. 4 and 9) from the linked data lists 251 stored in the linked data storage unit 226 (step S41). Here, the calculation unit 2281 acquires the linked data 25 for the first measurement condition (measurement condition (1). The linked data 25 for the n-th measurement condition is data in which the measurement condition ID6 allocated to the n-th measurement condition and the respective flicker values of the measurement regions 10-1 to 10-5 are linked. When the number of DUT screens 1 of the same model is, for example, 1000, the number of linked data 25 for the n-th measurement condition is 1000.

The calculation unit 2281 calculates the statistics of the flicker values for the n-th measurement condition (for example, the minimum value of the flicker values, the first quartile of the flicker values, the median value of the flicker values (the second quartile), the third quartile of the flicker values, the maximum value of the flicker values) using the flicker values included in the acquired linked data 25 (here, the measurement regions 10-1 to 10-5 are not distinguished) (step S42). Here, the statistics of the flicker values for the first measurement condition (measurement condition (1)) are calculated.

The calculation unit 2281 determines whether the statistics of the flicker values have been calculated for all of the plurality of measurement conditions (FIG. 4) (step S43). When it is determined that the statistics of the flicker values have not been calculated for all of the plurality of measurement conditions (No in step S43), the calculation unit 2281 sets n=n+1 (step S44). As a result, the process of steps S41 to S43 is performed for the next measurement condition. Here, the second measurement condition (measurement condition (2)) is the target.

When the calculation unit 2281 determines that the statistics of the flicker values have been calculated for all of the plurality of measurement conditions (Yes in step S43), the generation unit 2282 generates a graph showing the statistics of the flicker values measured under each of a plurality of measurement conditions (step S45). The output unit 2283 outputs the graph generated by the generation unit 2282 (step S46).

Figure 15:
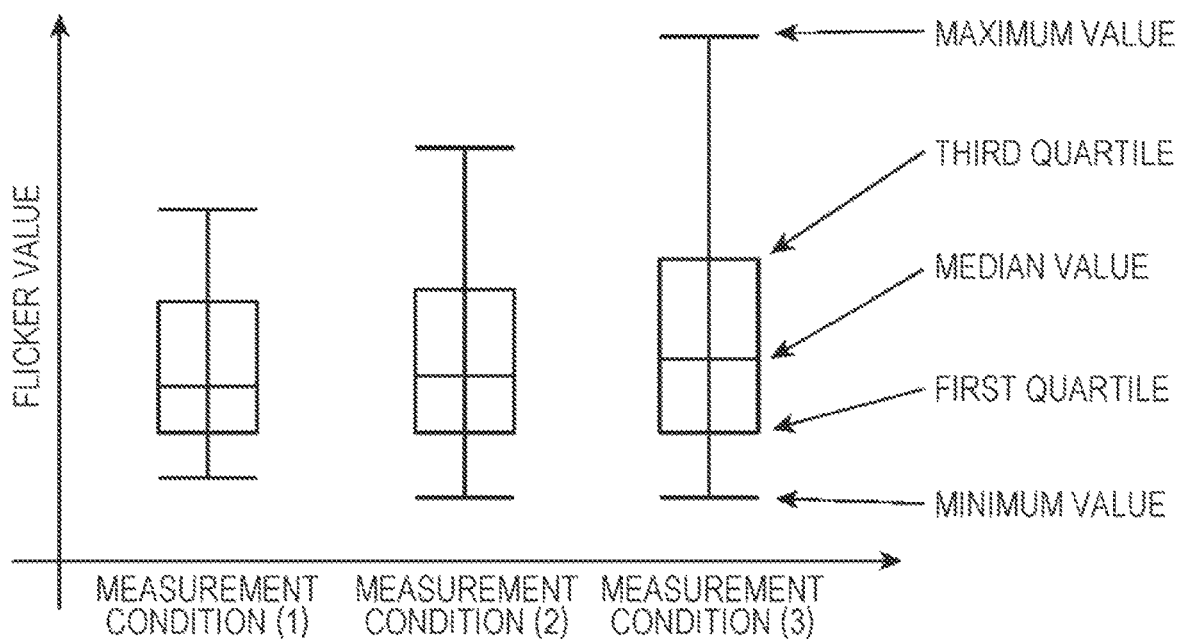
FIG. 15 is an explanatory diagram illustrating an example of a graph generated by a generation unit in the first modification.

FIG. 15 is an explanatory diagram illustrating an example of a graph generated by the generation unit 2282 in the first modification. This graph is a box plot. The number of a plurality of measurement conditions is three. Referring to FIG. 15, as the measurement conditions change to the measurement conditions (1), the measurement conditions (2), and the measurement conditions (3), the amount of change in the maximum value of the flicker values is large, compared with the amount of change in the median value of the flicker values. From this, it can be seen that the flicker value of a specific measurement region 10 is large.

According to the first modification, a graph showing the statistics of the flicker values is output for each of the plurality of measurement conditions. Therefore, the developer, designer, manufacturer, and the like of the DUT screen 1 can develop, design, manufacture, and the like the DUT screen 1 in consideration of these results.

The second modification will be described. In the first modification, the statistics of the flicker values for each of the plurality of measurement conditions are obtained, but in the second modification, the statistics of the flicker values for each of the measurement regions 10-1 to 10-5 (a plurality of measurement regions 10) are obtained. In the second modification, since the definition of the measurement regions 10-1 to 10-5 is fixed, in the plurality of measurement conditions (FIG. 4), the calculation conditions are the same, and the display conditions are different. For example, the respective calculation conditions in the plurality of measurement conditions are the calculation condition (1).

Referring to FIG. 13, the calculation unit 2281 calculates, for each of the measurement regions 10-1 to 10-5, the statistics of the flicker values based on the linked data 25 included in the linked data list 251 for each of the plurality of measurement conditions (FIG. 4) obtained from each of a large number of DUT screens 1 (plurality of DUT screens 1) of the same model. The generation unit 2282 generates a graph showing the statistics of the flicker values calculated by the calculation unit 2281 for each of the measurement regions 10-1 to 10-5. The output unit 2283 outputs the graph generated by the generation unit 2282.

Figure 16:
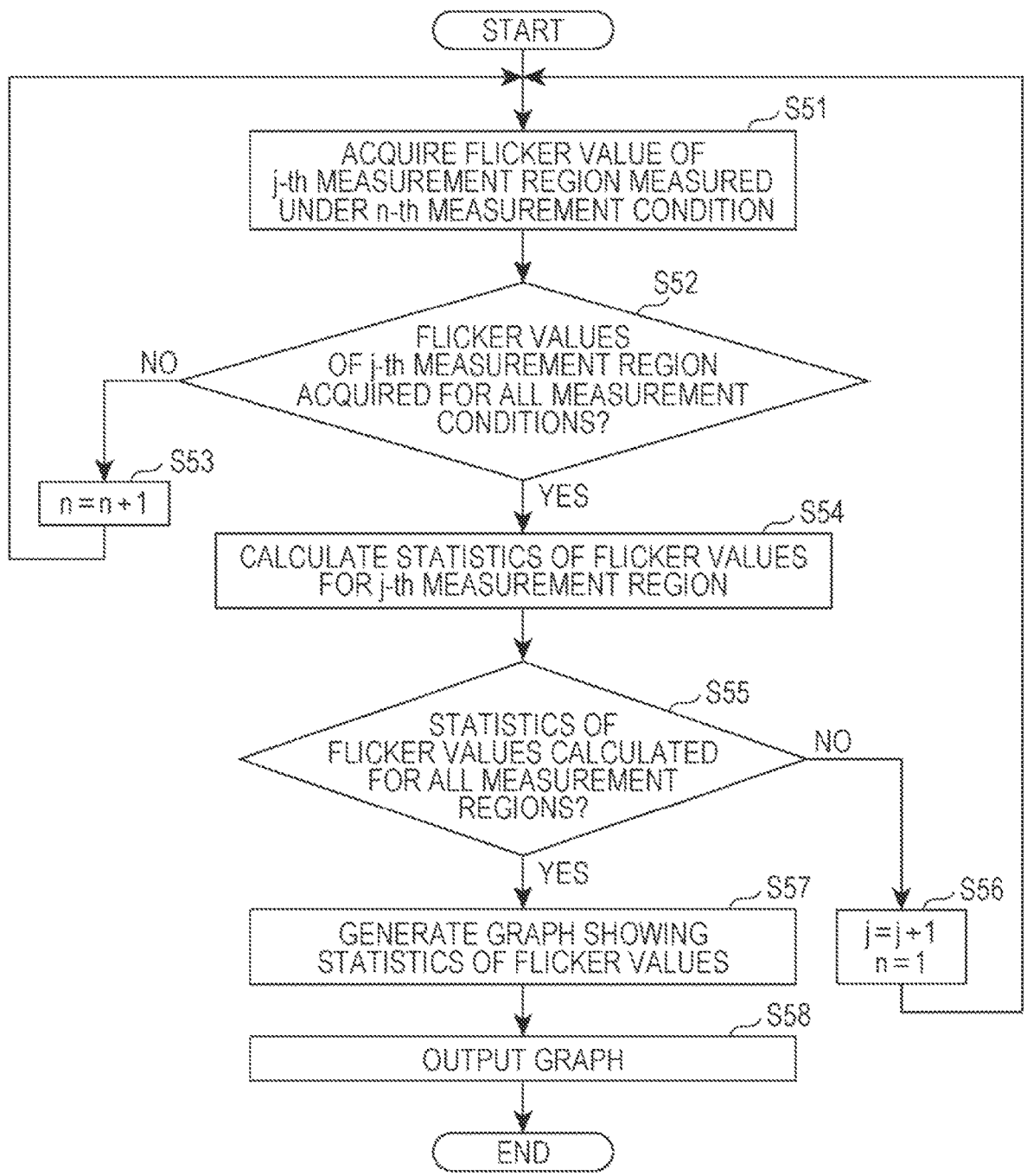
FIG. 16 is a flowchart illustrating the operation of a flicker evaluation assistance device provided in a two-dimensional flicker measurement device according to a second modification.

The operation of the flicker evaluation assistance device 228 provided in the two-dimensional flicker measurement device 2a according to the second modification will be described. FIG. 16 is a flowchart illustrating this operation. j indicates the number of the measurement region 10, and n indicates the number of the measurement condition. Referring to FIGS. 13 and 16, the calculation unit 2281 sets j=1 and n=1, and acquires the flicker value of the j-th measurement region 10 measured wider the n-th measurement condition from the linked data lists 251 stored in the linked data storage unit 226 (step S51). Here, the calculation unit 2281 acquires the flicker value of the first measurement region 10 (measurement region 10-1) measured under the first measurement condition.

The calculation unit 2281 determines whether the flicker values of the j-th measurement region 10 have been acquired for all of the plurality of measurement conditions (step S52). Here, the first measurement region 10 (measurement region 10-1) is the target. When it is determined that the flicker values of the j-th measurement region 10 have not been acquired for all of the plurality of measurement conditions (No in step S52), the calculation unit 2281 sets n=n+1 (step S53). As a result, the process of steps S51 to S52 is performed for the next measurement condition. Here, the second measurement condition is the target.

When it is determined that the flicker values of the j-th measurement region 10 have been acquired for all of the plurality of measurement conditions (Yes in step S52), the calculation unit 2281 calculates the statistics of the flicker values for the j-th measurement region 10 based on the flicker values acquired so far (step S54). Here, the first measurement region 10 (measurement region 10-1) is the target.

The calculation unit 2281 determines whether the statistics of the flicker values have been calculated for all of the measurement regions 10-1 to 10-5 (step S55). When it is determined that the statistics of the flicker values have not been calculated for all of the measurement regions 10-1 to 10-5 (No in step S55), the calculation unit 2281 sets j=j+1 and n=1 (step S56). As a result, the process of steps S51 to S55 is performed for the next measurement region 10. Here, the second measurement region 10 (measurement region 10-2) is the target.

When the calculation unit 2281 determines that the statistics of the flicker values have been calculated for all of the measurement regions 10-1 to 10-5 (Yes in step S55), the generation unit 2282 generates a graph showing the statistics of the flicker values for each of the measurement regions 10-1 to 10-5 (step S57). The output unit 2283 outputs the graph generated by the generation unit 2282 (step S58).

Figure 17:
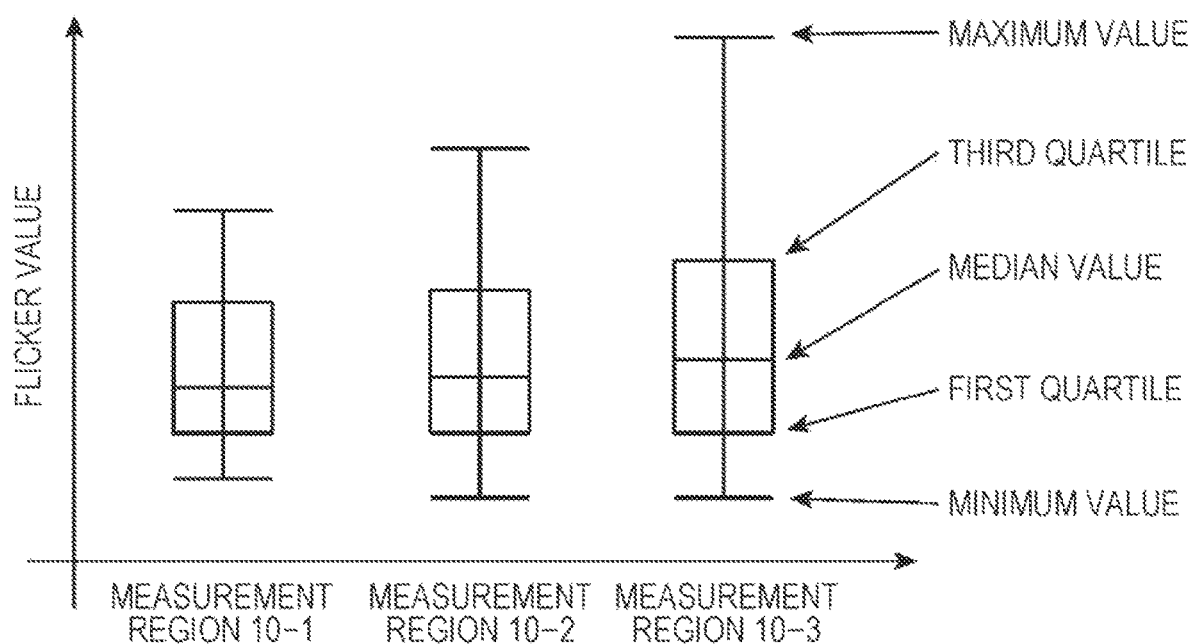
FIG. 17 is an explanatory diagram illustrating an example of a graph generated by a generation unit in the second modification.

FIG. 17 is an explanatory diagram illustrating an example of a graph generated by the generation unit 2282 in the second modification. This graph is a box plot. The statistics of the flicker values for the measurement regions 10-1 to 10-3 among the measurement regions 10-1 to 10-5 are shown, and the statistics of the flicker values for the measurement regions 10-4 to 10-5 are omitted. It can be seen that the variation in the flicker values in the measurement region 10-3 is large.

According to the second modification, a graph showing the statistics of the flicker values is output for each of the measurement regions 10-1 to 10-5 set on the DUT screen 1. Therefore, the developer, designer, manufacturer, and the like of the DUT screen 1 can develop, design, manufacture, and the like the DUT screen 1 in consideration of these results.

SUMMARY OF EMBODIMENTS

The flicker measurement device according to a first aspect of the embodiment includes a first processing unit that performs a first process of calculating respective flicker values of a plurality of measurement regions set for the measurement object based on a photometric quantity of a measurement object obtained from the measurement object under a measurement condition of a flicker for each of the plurality of measurement conditions stored in advance in a measurement condition storage unit, a second processing unit that performs a second process of generating linked data in which data composed of the flicker value of each of the plurality of measurement regions calculated by the first processing unit and the measurement conditions are linked for each of the plurality of measurement conditions, and a third processing unit that performs a third process of storing the linked data generated by the second processing unit in a linked data storage unit for each of the plurality of measurement conditions.

The flicker measurement device may be a spot type flicker measurement device or a two-dimensional flicker measurement device. The measurement condition storage unit and the linked data storage unit may be provided in the flicker measurement device, or may be provided in another device (for example, a computer device capable of communicating with a flicker measurement device).

The photometric quantity is a physical quantity that collectively refers to the luminance and the image information signal. The luminance is a light intensity of the DUT screen measured by a two-dimensional imaging device or a probe having the spectral sensitivity characteristics of the luminosity curve $V(\lambda)$. The image information signal is a light intensity signal (RAW image data) generated by the two-dimensional imaging device when the two-dimensional imaging device having an any spectral sensitivity characteristics images the DUT screen.

The linked data is the data in which the respective flicker values, of the plurality of measurement regions set on the measurement object, measured under the flicker measurement condition and the measurement conditions are linked. The flicker measurement device according to the first aspect of the embodiment generates the linked data for each of a plurality of measurement conditions, and stores the linked data in the linked data storage unit. Therefore, according to the flicker measurement device according to the first aspect of the embodiment, even when the data required for evaluating the unevenness of flickers increases, it can be efficiently managed.

In the above configuration, the flicker measurement device is a two-dimensional flicker measurement device including an imaging unit including a two-dimensional imaging device, and wherein the first processing unit includes calculating the flicker value of each of the plurality of measurement regions set for the measurement object based on a photometric quantity of the measurement object obtained when the imaging unit images the measurement object.

The two-dimensional flicker measurement device may be a device manufactured for flicker measurement, or may be a computer device (for example, a personal computer, a tablet terminal, a smartphone) in which a program for flicker measurement is installed. In the former case, the imaging unit (camera) built in the device images the measurement object. In the latter case, the imaging unit (camera) externally attached to the computer device images the measurement object.

In the above configuration, the plurality of the measurement conditions includes a display condition used to display a 1st image for flicker measurement on the measurement object, and a calculation condition used to calculate the flicker values based on a 2nd image obtained when the imaging unit images the measurement object which displays the 1st image.

The 1st image can be rephrased as a test pattern or a display pattern. The display conditions include, for example, the drive frequency and common voltage used when the measurement object displays the 1st image, and the definition of the 1st image. The plurality of the calculation conditions includes, for example, respective positions and sizes of the plurality of measurement regions, and a shooting interval and the number of shots of the 1st image displayed on the measurement object.

The flicker measurement method according to a second aspect of the embodiment includes a first processing step of performing a first process of calculating respective flicker values of a plurality of measurement regions set on a measurement object based on a photometric quantity of the measurement object obtained from the measurement object under a measurement condition of a flicker for each of the plurality of measurement conditions stored in advance in a measurement condition storage unit, a second processing step of performing a second process of generating linked data in which data composed of the respective flicker values of the plurality of measurement regions calculated by the first processing step and the measurement conditions are linked for each of the plurality of measurement conditions, and a third processing step of performing a third process of storing the linked data generated by the second processing step in a linked data storage unit for each of the plurality of measurement conditions.

The flicker measurement method according to the second aspect of the embodiment defines the flicker measurement device according to the first aspect of the embodiment from the viewpoint of the method, and has the same effect as the flicker measurement device according to the first aspect of the embodiment.

The flicker measurement program according to a third aspect of the embodiment causes a computer to execute a first processing step of performing a first process of calculating respective flicker values of a plurality of measurement regions set on a measurement object based on a photometric quantity of the measurement object obtained from the measurement object under a measurement condition of a flicker for each of the plurality of measurement conditions stored in advance in a measurement condition storage unit, a second processing step of performing a second process of generating linked data in which data composed of the respective flicker values of the plurality of measurement regions calculated by the first processing step and the measurement conditions are linked for each of the plurality of measurement conditions, and a third processing step of performing a third process of storing the linked data generated by the second processing step in a linked data storage unit for each of the plurality of measurement conditions.

The flicker measurement program according to the third aspect of the embodiment defines the flicker measurement device according to the first aspect of the embodiment from the viewpoint of the program, and has the same effect as the flicker measurement device according to the first aspect of the embodiment.

The flicker evaluation assistance device according to a fourth aspect of the embodiment is a flicker evaluation assistance device that supports a flicker evaluation based on linked data stored in a linked data storage unit, wherein the linked data stored in the linked data storage unit is obtained by performing a first process of calculating respective flicker values of a plurality of measurement regions set on a measurement object based on a photometric quantity of the measurement object obtained from the measurement object under a measurement condition of the flicker, for each of a plurality of the measurement conditions stored in advance in a measurement condition storage unit, performing a second process of generating the linked data in which data composed of the respective flicker values of the plurality of measurement regions calculated by the first process and the measurement conditions are linked for each of the plurality of measurement conditions, and performing a third process of storing the linked data generated in the second process in the linked data storage unit for each of the plurality of measurement conditions, and the flicker evaluation assistance device includes a calculation unit that calculates statistics of the flicker values for each of the plurality of measurement conditions based on the linked data for each of the plurality of measurement conditions obtained from each of the plurality of measurement objects, a generation unit that generates a graph showing the statistics calculated by the calculation unit for each of the plurality of measurement conditions, and an output unit that outputs the graph generated by the generation unit.

The graph showing the statistics of the flicker values is, for example, a box plot and an Xbar-R control chart. According to the flicker evaluation assistance device according to the fourth aspect of the embodiment, a graph showing the statistics of the flicker values is output for each of the plurality of measurement conditions. Therefore, the developer, designer, manufacturer, and the like of the measurement object can develop, design, manufacture, and the like the measurement object in consideration of these results.

The flicker evaluation assistance method according to a fifth aspect of the embodiment is a flicker evaluation assistance method of supporting an evaluation of a flicker based on linked data stored in a linked data storage unit, wherein the linked data stored in the linked data storage unit is obtained by performing a first process of calculating respective flicker values of a plurality of measurement regions set on a measurement object based on a photometric quantity of the measurement object obtained from the measurement object under a measurement condition of the flicker, for each of a plurality of the measurement conditions stored in advance in a measurement condition storage unit, performing a second process of generating the linked data in which data composed of the respective flicker values of the plurality of measurement regions calculated by the first process and the measurement conditions are linked for each of the plurality of measurement conditions, and performing a third process of storing the linked data generated in the second process in the linked data storage unit for each of the plurality of measurement conditions, and the flicker evaluation assistance method includes a calculation step of calculating statistics of the flicker values for each of the plurality of measurement conditions based on the linked data for each of the plurality of measurement conditions obtained from each of the plurality of measurement objects, a generation step of generating a graph showing the statistics calculated by the calculation step for each of the plurality of measurement conditions, and an output step of outputting the graph generated by the generation step.

The flicker evaluation assistance method according to the fifth aspect of the embodiment defines the flicker evaluation assistance device according to the fourth aspect of the embodiment from the viewpoint of the method, and has the same effect as the flicker evaluation assistance device according to the fourth aspect of the embodiment.

The flicker evaluation assistance program according to a sixth aspect of the embodiment is a flicker evaluation assistance program of supporting an evaluation of a flicker based on linked data stored in a linked data storage unit, wherein the linked data stored in the linked data storage unit is obtained by performing a first process of calculating respective flicker values of a plurality of measurement regions set on a measurement object based on a photometric quantity of the measurement object obtained from the measurement object under a measurement condition of the flicker, for each of a plurality of the measurement conditions stored in advance in a measurement condition storage unit, performing a second process of generating the linked data in which data composed of the respective flicker values of the plurality of measurement regions calculated by the first process and the measurement conditions are linked for each of the plurality of measurement conditions, and performing a third process of storing the linked data generated in the second process in the linked data storage unit for each of the plurality of measurement conditions, and the flicker evaluation assistance program causes a computer to execute a calculation step of calculating statistics of the flicker values for each of the plurality of measurement conditions based on the linked data for each of the plurality of measurement conditions obtained from each of the plurality of measurement objects, a generation step of generating a graph showing the statistics calculated by the calculation step for each of the plurality of measurement conditions, and an output step of outputting the graph generated by the generation step.

The flicker evaluation assistance program according to the sixth aspect of the embodiment defines the flicker evaluation assistance device according to the fourth aspect of the embodiment from the viewpoint of the program, and has the same effect as the flicker evaluation assistance device according to the fourth aspect of the embodiment.

The flicker evaluation assistance device according to a seventh aspect of the embodiment is a flicker evaluation assistance device that supports a flicker evaluation based on linked data stored in a linked data storage unit, wherein the linked data stored in the linked data storage unit is obtained by performing a first process of calculating respective flicker values of a plurality of measurement regions set on a measurement object based on a photometric quantity of the measurement object obtained from the measurement object under a measurement condition of the flicker, for each of a plurality of the measurement conditions stored in advance in a measurement condition storage unit, performing a second process of generating the linked data in which data composed of the respective flicker values of the plurality of measurement regions calculated by the first process and the measurement conditions are linked for each of the plurality of measurement conditions, and performing a third process of storing the linked data generated in the second process in the linked data storage unit for each of the plurality of measurement conditions, and the flicker evaluation assistance device includes a calculation unit that calculates statistics of the flicker values for each of the plurality of measurement regions based on the linked data for each of the plurality of measurement conditions obtained from each of the plurality of measurement objects, a generation unit that generates a graph showing the statistics calculated by the calculation unit for each of the plurality of measurement regions, and an output unit that outputs the graph generated by the generation unit.

The graph showing the statistics of the flicker values is, for example, a box plot and an Xbar-R control chart. According to the flicker evaluation assistance device according to the seventh aspect of the embodiment, a graph showing the statistics of the flicker values is output for each of the plurality of measurement regions set on the measurement object. Therefore, the developer, designer, manufacturer, and the like of the measurement object can develop, design, manufacture, and the like the measurement object in consideration of these results.

The flicker evaluation assistance method according to an eighth aspect of the embodiment is a flicker evaluation assistance method of supporting an evaluation of a flicker based on linked data stored in a linked data storage unit, wherein the linked data stored in the linked data storage unit is obtained by performing a first process of calculating respective flicker values of a plurality of measurement regions set on a measurement object based on a photometric quantity of the measurement object obtained from the measurement object under a measurement condition of the flicker, for each of a plurality of the measurement conditions stored in advance in a measurement condition storage unit, performing a second process of generating the linked data in which data composed of the respective flicker values of the plurality of measurement regions calculated by the first process and the measurement conditions are linked for each of the plurality of measurement conditions, and performing a third process of storing the linked data generated in the second process in the linked data storage unit for each of the plurality of measurement conditions, and the flicker evaluation assistance method includes a calculation step of calculating statistics of the flicker values for each of the plurality of measurement regions based on the linked data for each of the plurality of measurement conditions obtained from each of the plurality of measurement objects, a generation step of generating a graph showing the statistics calculated by the calculation step for each of the plurality of measurement regions, and an output step of outputting the graph generated by the generation step.

The flicker evaluation assistance method according to the eighth aspect of the embodiment defines the flicker evaluation assistance device according to the seventh aspect of the embodiment from the viewpoint of the method, and has the same effect as the flicker evaluation assistance device according to the seventh aspect of the embodiment.

The flicker evaluation assistance program according to a ninth aspect of the embodiment is a flicker evaluation assistance program of supporting an evaluation of a flicker based on linked data stored in a linked data storage unit, wherein the linked data stored in the linked data storage unit is obtained by performing a first process of calculating respective flicker values of a plurality of measurement regions set on a measurement object based on a photometric quantity of the measurement object obtained from the measurement object under a measurement condition of the flicker, for each of a plurality of the measurement conditions stored in advance in a measurement condition storage unit, performing a second process of generating the linked data in which data composed of the respective flicker values of the plurality of measurement regions calculated by the first process and the measurement conditions are linked for each of the plurality of measurement conditions, and performing a third process of storing the linked data generated in the second process in the linked data storage unit for each of the plurality of measurement conditions, and the flicker evaluation assistance program causes a computer to execute a calculation step of calculating statistics of the flicker values for each of the plurality of measurement regions based on the linked data for each of the plurality of measurement conditions obtained from each of the plurality of measurement objects, a generation step of generating a graph showing the statistics calculated by the calculation step for each of the plurality of measurement regions, and an output step of outputting the graph generated by the generation step.

The flicker evaluation assistance program according to the ninth aspect of the embodiment defines the flicker evaluation assistance device according to the seventh aspect of the embodiment from the viewpoint of the program, and has the same effect as the flicker evaluation assistance device according to the seventh aspect of the embodiment.

Although embodiments of the present invention have been illustrated and described in detail, they are merely illustrations and examples and are not limited. The scope of the invention should be construed by the wording of the accompanying claims.

This application claims priority from Japanese Patent Application No. 2018195624 filed on Oct. 17, 2018, the entire disclosure of which is incorporated herein by reference in its entirety.

INDUSTRIAL APPLICABILITY

According to the present invention, a flicker measurement device, a flicker measurement method, a flicker measurement program, a flicker evaluation assistance device, a flicker evaluation assistance method, and a flicker evaluation assistance program can be provided.

The invention claimed is:
1. A flicker measurement device comprising:
a hardware processor that performs a first process of calculating respective flicker values of a plurality of measurement regions set on a measurement object based on a photometric quantity of the measurement object obtained from the measurement object under a measurement condition of a flicker for each of the plurality of measurement conditions stored in advance in the hardware processor;
that performs a second process of generating linked data in which data composed of the respective flicker values of the plurality of measurement regions and the measurement conditions are linked for each of the plurality of measurement conditions; and
that performs a third process of storing the linked data in the hardware processor for each of the plurality of measurement conditions, wherein
the flicker measurement device is a two-dimensional flicker measurement device including an imager including a two-dimensional imaging device,
the hardware processor includes calculating the respective flicker values of the plurality of measurement regions set on the measurement object based on a photometric quantity of the measurement object obtained when the imager images the measurement object, and
the plurality of the measurement conditions includes:
a display condition used to display a 1st image for flicker measurement on the measurement object, and a calculation condition used to calculate the flicker values based on a 2nd image obtained when the imager images the measurement object which displays the 1st image.

2. The flicker measurement device according to claim 1, wherein
the plurality of the calculation conditions includes respective positions and sizes of the plurality of measurement regions, and a shooting interval and the number of shots of the 1st image displayed on the measurement object.

3. A flicker measurement method comprising:
performing a first process of calculating respective flicker values of a plurality of measurement regions set on a measurement object based on a photometric quantity of the measurement object obtained from the measurement object under a measurement condition of a flicker for each of the plurality of measurement conditions stored in advance in a hardware processor;
performing a second process of generating linked data in which data composed of the respective flicker values of the plurality of measurement regions calculated by the first process and the measurement conditions are linked for each of the plurality of measurement conditions; and
performing a third process of storing the linked data generated by the second process in the hardware processor for each of the plurality of measurement conditions, wherein
the photometric quantity of the measurement object is obtained by a two-dimensional flicker measurement device including an imager including a two-dimensional imaging device,
the first process is performed when the imager images the measurement object, and
the plurality of the measurement conditions includes:
a display condition used to display a 1st image for flicker measurement on the measurement object, and
a calculation condition used to calculate the flicker values based on a 2nd image obtained when the imager images the measurement object which displays the 1st image.

4. A non-transitory recording medium storing a computer readable flicker measurement program causing a computer to execute:
performing a first process of calculating respective flicker values of a plurality of measurement regions set on a measurement object based on a photometric quantity of the measurement object obtained from the measurement object under a measurement condition of a flicker for each of the plurality of measurement conditions stored in advance in a hardware processor;
performing a second process of generating linked data in which data composed of the respective flicker values of the plurality of measurement regions calculated by the first process and the measurement conditions are linked for each of the plurality of measurement conditions; and
performing a third process of storing the linked data generated by the second process in the hardware processor for each of the plurality of measurement conditions, wherein
the photometric quantity of the measurement object is obtained by a two-dimensional flicker measurement device including an imager including a two-dimensional imaging device,
the first process is performed when the imager images the measurement object, and
the plurality of the measurement conditions includes:
a display condition used to display a 1st image for flicker measurement on the measurement object, and
a calculation condition used to calculate the flicker values based on a 2nd image obtained when the imager images the measurement object which displays the 1st image.

5. A flicker evaluation assistance device that supports a flicker evaluation based on linked data stored in a hardware processor, wherein
the linked data stored in the hardware processor is obtained by
performing a first process of calculating respective flicker values of a plurality of measurement regions set on a measurement object based on a photometric quantity of the measurement object obtained from the measurement object under a measurement condition of the flicker, for each of a plurality of the measurement conditions stored in advance in the hardware processor,
performing a second process of generating the linked data in which data composed of the respective flicker values of the plurality of measurement regions calculated by the first process and the measurement conditions are linked for each of the plurality of measurement conditions, and
performing a third process of storing the linked data generated in the second process in the hardware processor for each of the plurality of measurement conditions, and
the flicker evaluation assistance device includes
a calculator that calculates statistics of the flicker values for each of the plurality of measurement conditions based on the linked data for each of the plurality of measurement conditions obtained from each of the plurality of measurement objects,
a generator that generates a graph showing the statistics calculated by the calculator for each of the plurality of measurement conditions, and
an outputter that outputs the graph generated by the generator.

6. A flicker evaluation assistance method of supporting an evaluation of a flicker based on linked data stored in a hardware processor, wherein
the linked data stored in the hardware processor is obtained by
performing a first process of calculating respective flicker values of a plurality of measurement regions set on a measurement object based on a photometric quantity of the measurement object obtained from the measurement object under a measurement condition of the flicker, for each of a plurality of the measurement conditions stored in advance in the hardware processor,
performing a second process of generating the linked data in which data composed of the respective flicker values of the plurality of measurement regions calculated by the first process and the measurement conditions are linked for each of the plurality of measurement conditions, and
performing a third process of storing the linked data generated in the second process in the hardware processor for each of the plurality of measurement conditions, and
the flicker evaluation assistance method includes
calculating statistics of the flicker values for each of the plurality of measurement conditions based on the linked data for each of the plurality of measurement conditions obtained from each of the plurality of measurement objects, generating a graph showing the statistics calculated by the calculating for each of the plurality of measurement conditions, and outputting the graph generated by the generating.

7. A non-transitory recording medium storing a computer readable flicker evaluation assistance program of supporting an evaluation of a flicker based on linked data stored in a hardware processor, wherein the linked data stored in the hardware processor is obtained by performing a first process of calculating respective flicker values of a plurality of measurement regions set on a measurement object based on a photometric quantity of the measurement object obtained from the measurement object under a measurement condition of the flicker, for each of a plurality of the measurement conditions stored in advance in the hardware processor, performing a second process of generating the linked data in which data composed of the respective flicker values of the plurality of measurement regions calculated by the first process and the measurement conditions are linked for each of the plurality of measurement conditions, and performing a third process of storing the linked data generated in the second process in the hardware processor for each of the plurality of measurement conditions, and the flicker evaluation assistance program causes a computer to execute calculating statistics of the flicker values for each of the plurality of measurement conditions based on the linked data for each of the plurality of measurement conditions obtained from each of the plurality of measurement objects, generating a graph showing the statistics calculated by the calculating for each of the plurality of measurement conditions, and outputting the graph generated by the generating.

8. A flicker evaluation assistance device that supports a flicker evaluation based on linked data stored in a hardware processor, wherein the linked data stored in the hardware processor is obtained by performing a first process of calculating respective flicker values of a plurality of measurement regions set on a measurement object based on a photometric quantity of the measurement object obtained from the measurement object under a measurement condition of the flicker, for each of a plurality of the measurement conditions stored in advance in the hardware processor, performing a second process of generating the linked data in which data composed of the respective flicker values of the plurality of measurement regions calculated by the first process and the measurement conditions are linked for each of the plurality of measurement conditions, and performing a third process of storing the linked data generated in the second process in the hardware processor for each of the plurality of measurement conditions, and the flicker evaluation assistance device includes a calculator that calculates statistics of the flicker values for each of the plurality of measurement regions based on the linked data for each of the plurality of measurement conditions obtained from each of the plurality of measurement objects, a generator that generates a graph showing the statistics calculated by the calculator for each of the plurality of measurement regions, and an outputter that outputs the graph generated by the generator.

9. A flicker evaluation assistance method of supporting an evaluation of a flicker based on linked data stored in a hardware processor, wherein the linked data stored in the hardware processor is obtained by performing a first process of calculating respective flicker values of a plurality of measurement regions set on a measurement object based on a photometric quantity of the measurement object obtained from the measurement object under a measurement condition of the flicker, for each of a plurality of the measurement conditions stored in advance in the hardware processor, performing a second process of generating the linked data in which data composed of the respective flicker values of the plurality of measurement regions calculated by the first process and the measurement conditions are linked for each of the plurality of measurement conditions, and performing a third process of storing the linked data generated in the second process in the hardware processor for each of the plurality of measurement conditions, and the flicker evaluation assistance method includes calculating statistics of the flicker values for each of the plurality of measurement regions based on the linked data for each of the plurality of measurement conditions obtained from each of the plurality of measurement objects, generating a graph showing the statistics calculated by the calculating for each of the plurality of measurement regions, and outputting the graph generated by the generating.

10. A non-transitory recording medium storing a computer readable flicker evaluation assistance program of supporting an evaluation of a flicker based on linked data stored in a hardware processor, wherein the linked data stored in the hardware processor is obtained by performing a first process of calculating respective flicker values of a plurality of measurement regions set on a measurement object based on a photometric quantity of the measurement object obtained from the measurement object under a measurement condition of the flicker, for each of a plurality of the measurement conditions stored in advance in the hardware processor, performing a second process of generating the linked data in which data composed of the respective flicker values of the plurality of measurement regions calculated by the first process and the measurement conditions are linked for each of the plurality of measurement conditions, and performing a third process of storing the linked data generated in the second process in the hardware processor for each of the plurality of measurement conditions, and the flicker evaluation assistance program causes a computer to execute calculating statistics of the flicker values for each of the plurality of measurement regions based on the linked data for each of the plurality of measurement conditions obtained from each of the plurality of measurement objects,
generating a graph showing the statistics calculated by the calculating for each of the plurality of measurement regions, and
outputting the graph generated by the generating.

* * * * *